US008820520B2

(12) United States Patent
Triesenberg et al.

(10) Patent No.: US 8,820,520 B2
(45) Date of Patent: Sep. 2, 2014

(54) SORTER SLAT ATTACHMENT

(71) Applicant: Dematic Corp., Grand Rapids, MI (US)

(72) Inventors: Thomas H. Triesenberg, Rockford, MI (US); Jeffrey S. DeVries, Grand Rapids, MI (US); Dennis J. Schuitema, Ada, MI (US)

(73) Assignee: Dematic Corp., Grand Rapids, MI (US)

( * ) Notice: Subject to any disclaimer, the term of this patent is extended or adjusted under 35 U.S.C. 154(b) by 0 days.

(21) Appl. No.: 13/711,127

(22) Filed: Dec. 11, 2012

(65) Prior Publication Data
US 2013/0161154 A1    Jun. 27, 2013

Related U.S. Application Data

(60) Provisional application No. 61/579,720, filed on Dec. 23, 2011.

(51) Int. Cl.
*B65G 39/20*    (2006.01)
*B65G 47/34*    (2006.01)
*B25B 27/00*    (2006.01)

(52) U.S. Cl.
CPC ............... *B65G 47/34* (2013.01); *B25B 27/00* (2013.01)
USPC .................. 198/845; 198/370.02; 198/370.07

(58) Field of Classification Search
CPC . B65G 47/844; B65G 47/845; B65G 2207/36
USPC ........................ 198/370.02, 370.07, 890, 845
See application file for complete search history.

(56) References Cited

U.S. PATENT DOCUMENTS

| 2,588,984 A | 3/1952 | Kubisiak |
| 2,680,003 A | 1/1954 | Feinstein |
| 2,859,689 A | 11/1958 | Ackley |

(Continued)

FOREIGN PATENT DOCUMENTS

| DE | 4424110 C1 | 6/1995 |
| DE | 19648655 A1 | 5/1998 |

(Continued)

OTHER PUBLICATIONS

International Search Report (Form PCT/ISA/210) and Written Opinion of the International Searching Authority (Form PCT/ISA/237) from corresponding Patent Cooperation Treaty Application No. PCT/US2012/068968, mailed Mar. 12, 2013.

*Primary Examiner* — Leslie A Nicholson, III
*Assistant Examiner* — Keith R Campbell
(74) *Attorney, Agent, or Firm* — Gardner, Linn, Burkhart & Flory, LLP

(57) ABSTRACT

A positive displacement sorter includes a plurality of parallel laterally extending slats and a pair of wheel assemblies, each interconnecting common end portions of the slats thereby defining an endless web that travels in a longitudinal direction. An upper surface of the web defines an article-conveying surface. A plurality of pusher shoes travel along the slats in order to laterally displace articles on the conveying surface. A plurality of attachment mechanisms are provided. Each of the attachment mechanisms attaches an end portion of one of the slats to one of the wheel assemblies. Each of the attachment mechanisms includes a shoulder and a collar and at least one locking member. The collar engages the shoulder thereby providing retention of the slat to the wheel assembly. The locking member provides retention of the collar on the shoulder.

24 Claims, 22 Drawing Sheets

(56) References Cited

U.S. PATENT DOCUMENTS

| | | | | |
|---|---|---|---|---|
| 4,089,408 | A | 5/1978 | Vanderhoof | |
| 4,123,947 | A | 11/1978 | Smith et al. | |
| 4,770,291 | A | 9/1988 | Shaw | |
| 5,127,510 | A | 7/1992 | Cotter et al. | |
| 5,590,758 | A | 1/1997 | Wilkins et al. | |
| 5,595,279 | A | 1/1997 | Wilkins et al. | |
| 5,988,364 | A | 11/1999 | Boyce et al. | |
| 6,176,370 | B1 | 1/2001 | Davies | |
| 6,814,216 | B2 | 11/2004 | Veit et al. | |
| 6,860,376 | B1 * | 3/2005 | Heit et al. | 198/370.02 |
| 7,086,519 | B2 | 8/2006 | Veit et al. | |
| 7,357,242 | B2 * | 4/2008 | Enomoto | 198/370.02 |
| 7,370,751 | B2 * | 5/2008 | Smith et al. | 198/500 |
| 7,383,936 | B2 * | 6/2008 | Enomoto | 198/370.02 |
| 7,513,356 | B2 * | 4/2009 | Veit et al. | 198/370.02 |
| 7,562,761 | B2 * | 7/2009 | Tasma et al. | 198/370.02 |
| 7,857,116 | B2 * | 12/2010 | Heit et al. | 198/370.02 |
| 8,167,116 | B2 | 5/2012 | Schuitema et al. | |
| 8,260,574 | B1 * | 9/2012 | Schuitema et al. | 702/183 |
| 8,272,504 | B2 * | 9/2012 | Neugebauer et al. | 198/867.15 |
| 8,356,710 | B2 * | 1/2013 | Roy et al. | 198/867.14 |
| 8,622,203 | B2 * | 1/2014 | Poels et al. | 198/845 |
| 2002/0096417 | A1 | 7/2002 | Veit et al. | |
| 2005/0016821 | A1 | 1/2005 | Krisl | |
| 2005/0211534 | A1 | 9/2005 | Tefend | |
| 2011/0042181 | A1 | 2/2011 | Steenwyk et al. | |
| 2011/0233033 | A1 * | 9/2011 | Poels et al. | 198/845 |
| 2012/0048677 | A1 * | 3/2012 | Ramankutty et al. | 198/367 |

FOREIGN PATENT DOCUMENTS

| | | |
|---|---|---|
| EP | 1134172 B1 | 6/2003 |
| EP | 1834906 A2 | 9/2007 |
| JP | 2008115005 A | 5/2008 |

* cited by examiner

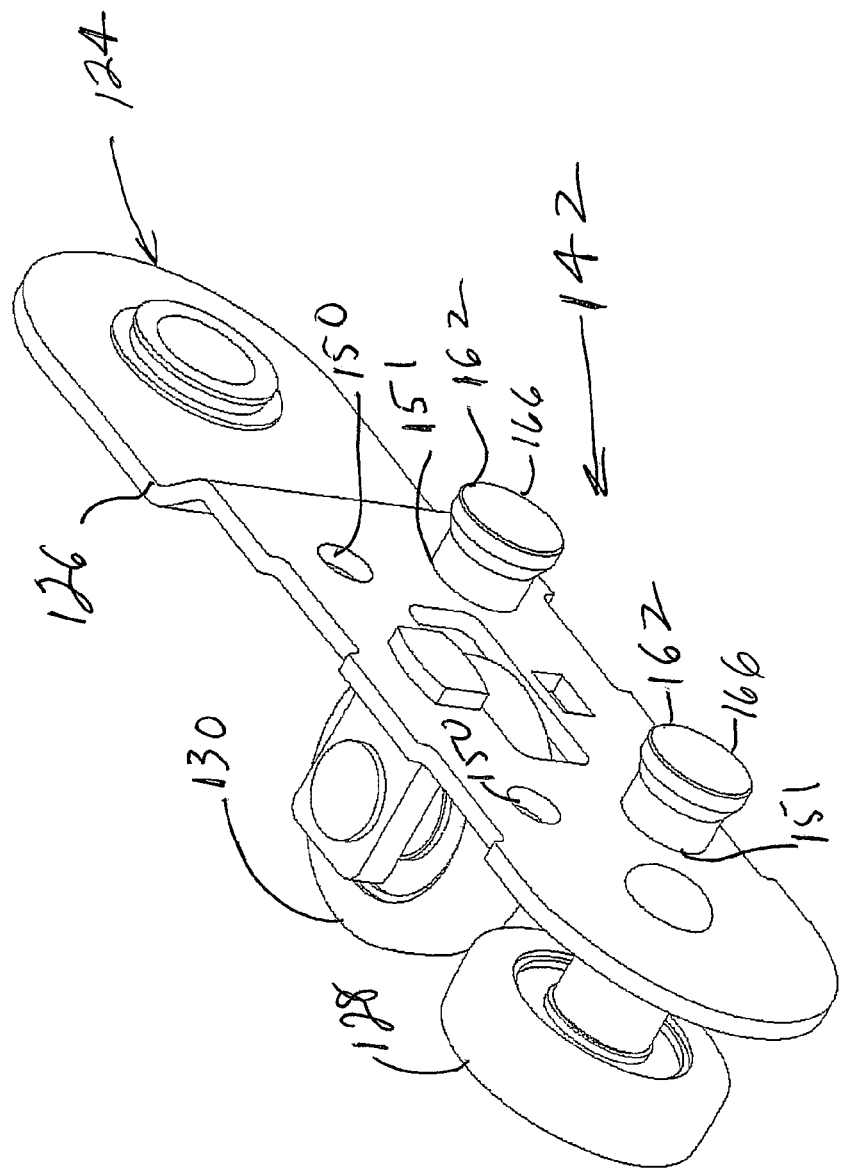

SORTER SLAT ATTACHMENT

CROSS-REFERENCE TO RELATED APPLICATIONS

This application claims priority from U.S. provisional patent application Ser. No. 61/579,720, filed on Dec. 23, 2011, the disclosure of which is hereby incorporated herein by reference in its entirety.

BACKGROUND OF THE INVENTION

The present invention is directed to a positive displacement shoe and slat sorter and in particular to a technique for easily removing and attaching slats to wheel assemblies.

Positive displacement sorters include a large number of generally parallel slats and wheel assemblies connected to opposite ends of the slats to hold the slats together in a web and to allow the web to travel under a motive force. The wheel assemblies may include covers, known as cap angles, in order to allow articles to be diverted off of the sorter without contacting the wheel assemblies. Some installations also include guards to restrict articles from falling off of the sorter in the case of a jamb condition.

The presence of cap angles, guards, and the like, make it cumbersome to remove a slat, such as to replace a pusher shoe, access the interior of the sorter, or the like. Therefore, proposals have been made to provide a slat-mounting arrangement that allows removal and reattachment of the slats with respect to the wheel assemblies without the need to remove the cap angle and/or the guards.

SUMMARY OF THE INVENTION

The present invention provides an attachment technique for removeably attaching slats of a shoe and slat sorter to wheel assemblies in a manner that is both easy to operate and is robust in construction.

A positive displacement sorter, according to an aspect of the invention, includes a plurality of parallel laterally extending slats and a pair of wheel assemblies, each interconnecting common end portions of the slats thereby defining an endless web that travels in a longitudinal direction. An upper surface of the web defines an article-conveying surface. A plurality of pusher shoes travel along the slats in order to laterally displace articles on the conveying surface. A plurality of attachment mechanisms are provided. Each attaches an end portion of one of the slats to one of the wheel assemblies. Each of the attachment mechanisms includes a shoulder and a collar and at least one locking member. The collar engages the shoulder thereby providing retention of the slat to the wheel assembly. The locking member provides retention of the collar on the shoulder. The locking member includes a generally horizontally moveable elongated member engaging an opening. The elongated member is on either the slat or the wheel assembly with the opening on the other of said slat or the wheel assembly.

The shoulder may be on the slat or wheel assembly and the collar on the other of the slat or wheel assembly. The shoulder may be on the wheel assembly and the collar is on the slat, with the generally horizontally moveable elongated member being on the slat and the opening on the wheel assembly.

Each of the wheel assemblies may include a generally vertical plate at each of the slats, wherein the openings and shoulder are at the generally vertical plate. The generally vertical plate may have a set of through-holes mounting the shoulder, with the through-holes being symmetrical with the locking openings. In this manner, a common configuration of the vertical plate may be used in both of the wheel assemblies.

The shoulder may include at least two spaced apart horizontally extending studs with at least two of the sockets engaging the studs. Each of the studs may include an enlarged head in order to laterally retain one of the sockets on that stud. The studs may be circular in cross section and the sockets may be semi-circular recesses.

The generally horizontally moveable elongated member may be a pin that is generally laterally moveable to engage the opening. A biasing mechanism may be provided to bias the pin into engagement with the opening. A retention fastener may be provided that passes through an opening in a neck of a cylinder and engages the pin to retain the pin in the cylinder against the bias of the biasing mechanism.

A pin retraction tool may be provided that is adapted to retract the pin from the opening to allow the associated slat to be connected to or disconnected from the wheel assembly. The locking member may be a plurality of spaced apart pins and biasing mechanisms and the pin retraction tool may have arms positioned to engage the plurality of pins to generally concurrently retract the pins from the openings. The pin retraction tool may be adapted to engage an end portion of each pin at the wheel assembly. The pin retraction tool may be adapted to engage the generally vertical plate in the wheel assembly to retract said pins from the openings. A tapered portion may be provided at each of the arms.

A method of removeably attaching a slat to a positive displacement sorter, according to an aspect of the invention, includes having attachment mechanisms connecting slats to chain assemblies. Each attachment mechanism includes a shoulder and a collar and at least one locking member. The collar engages the shoulder thereby providing retention of the slat to one of said wheel assemblies. The locking member provides retention of the collar on the shoulder. The locking member includes a generally horizontally moveable elongated member and an opening. The method further includes horizontally retracting the elongated member from the opening and separating said collar from the shoulder to remove the slat.

A pin retraction tool may be used to retract the pin from the opening to allow the associated slat to be connected to or disconnected from the wheel assembly. The locking member may include a plurality of spaced apart pins and biasing mechanisms and the pin retraction tool having arms positioned to engage the pins and generally concurrently retracting the pins from the openings. The pin retraction tool may pivot against one of the wheel assemblies to retract the pins from the openings. An end portion of each said pin may be engaged at the wheel assembly with the pin retraction tool. The pin retraction tool may pivot about a generally vertical plate of the wheel assembly to retract the pins from the openings. A tapered end of each arm may be used to compress the pins by positioning the tapered end between the pins and wheel assembly.

A pin retraction tool that is adapted to retracting a plurality of biased pins, according to an aspect of the invention, includes a plurality of spaced apart arms that can be positioned to engage the plurality of pins generally concurrently to retract the pins from openings. A handle joins the arms. An end of each of the arms is configured to retract the pins from openings in a plate.

A pivot may be defined in the arms or handle to pivot against a top of the plate to retract the pins. An opposite end of each of the arms may be configured to match an end of one of the pins in order to retract the pins to allow the pins to be inserted in the openings.

These and other objects, advantages and features of this invention will become apparent upon review of the following specification in conjunction with the drawings.

BRIEF DESCRIPTION OF THE DRAWINGS

FIG. 22 is a perspective view of the portion of the wheel assembly facing the slat in FIGS. 18-21 to define an attachment mechanism.

DESCRIPTION OF THE PREFERRED EMBODIMENT

Figure 1:
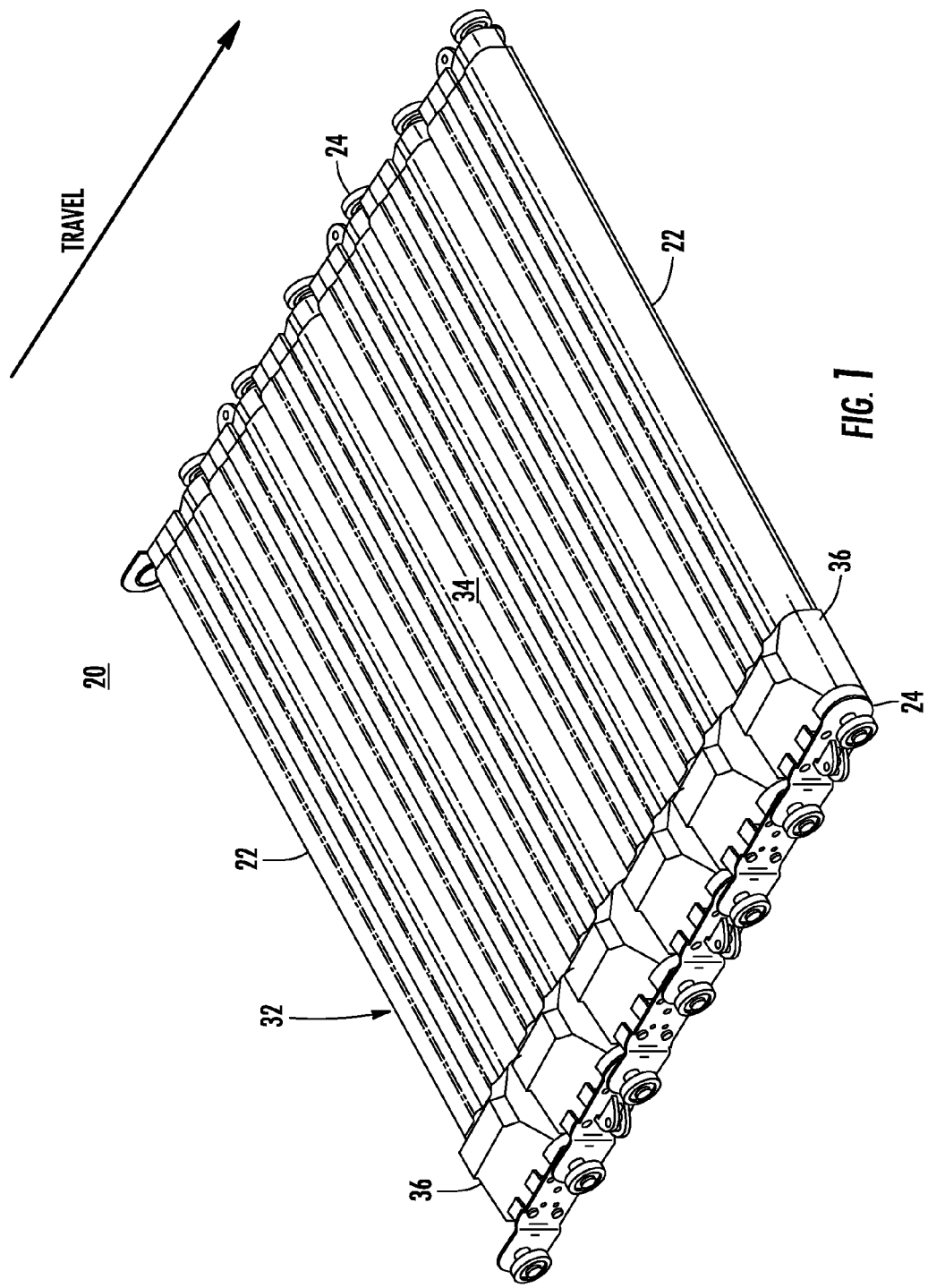
FIG. 1 is a perspective view of a positive displacement sorter, according to an embodiment of the invention.
Figure 2:
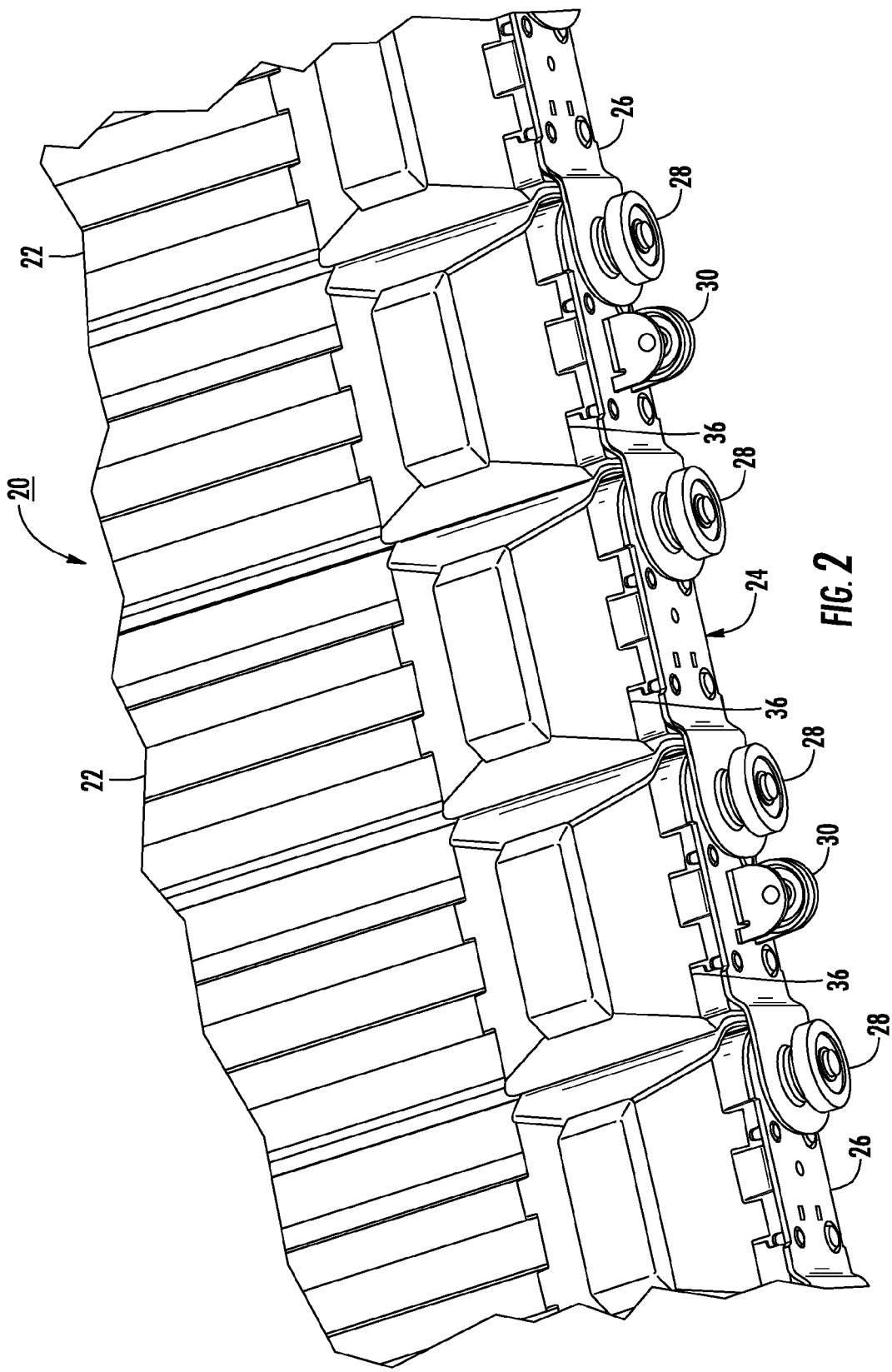
FIG. 2 is an enlarged perspective view of the positive displacement sorter in FIG. 1.
Figure 3:
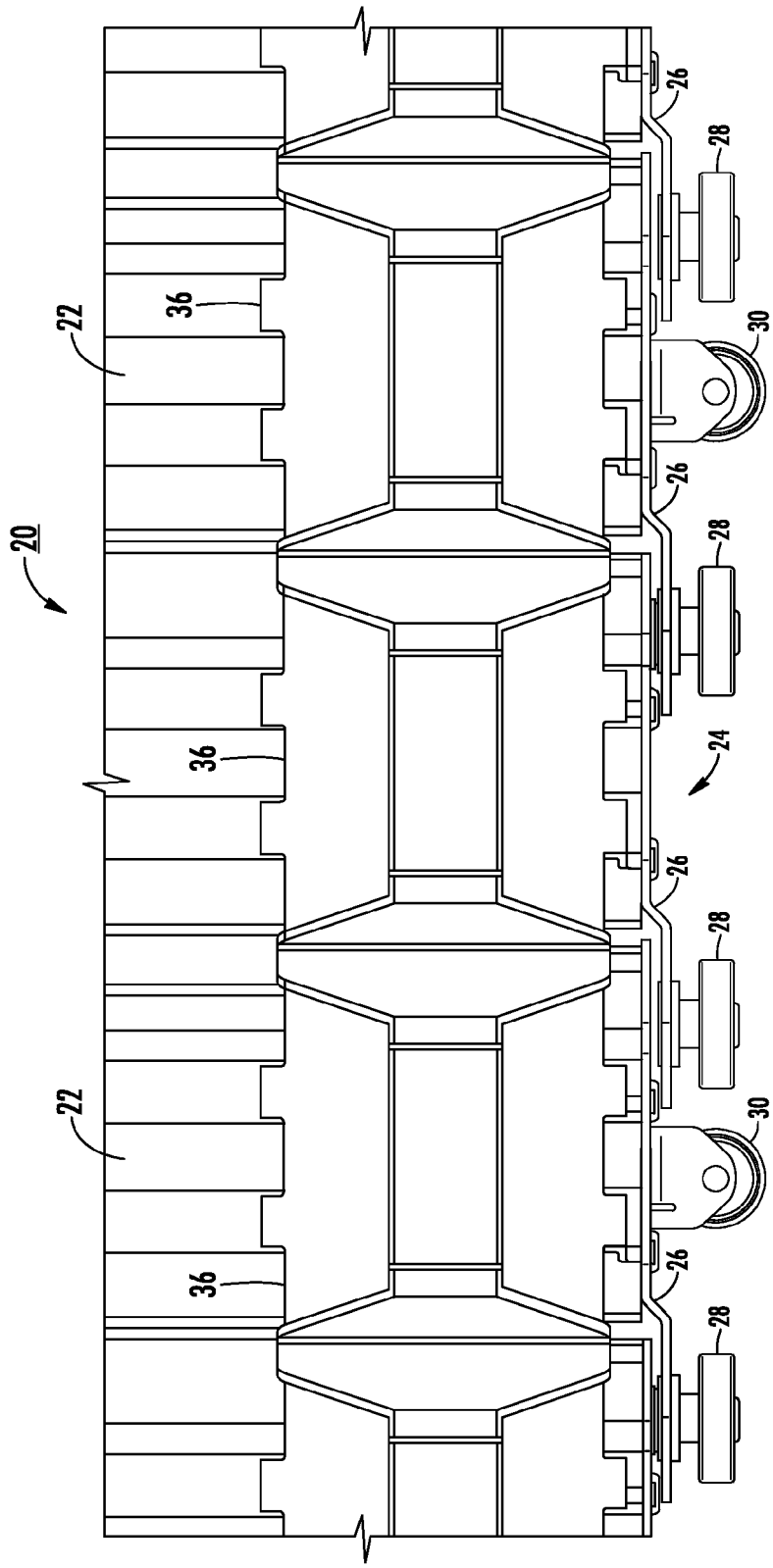
FIG. 3 is a top plan view of the sorter in FIG. 1.
Figure 4:
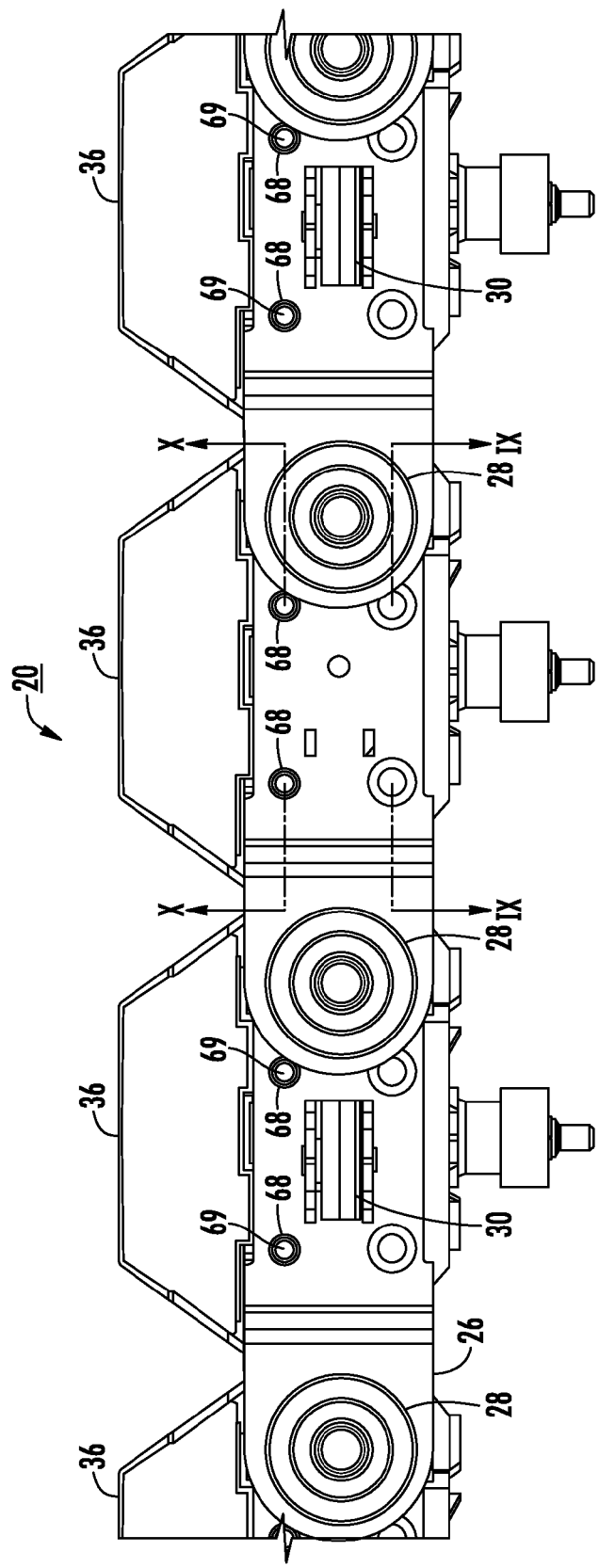
FIG. 4 is a side elevation taken from the direction III-III in FIG. 2.
Figure 5:
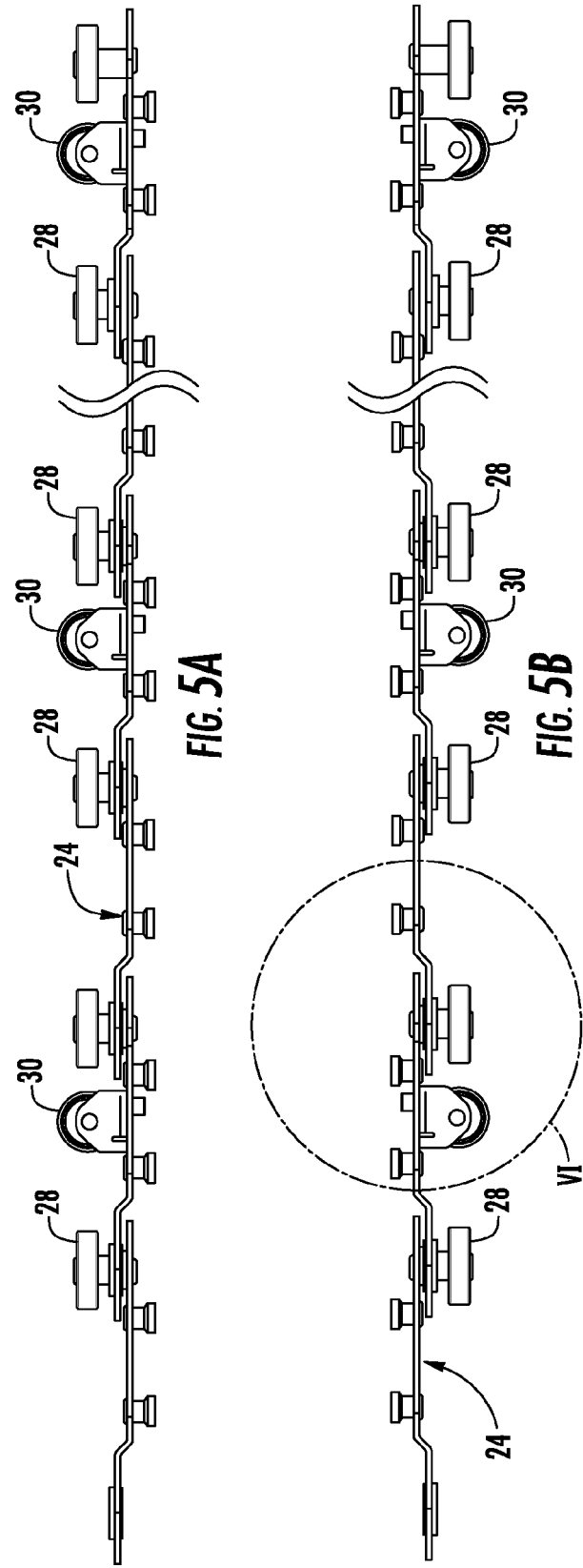
FIG. 5a is a top plan view of a left side wheel assembly.
FIG. 5b is a top plan view of a right side wheel assembly.
Figure 6:
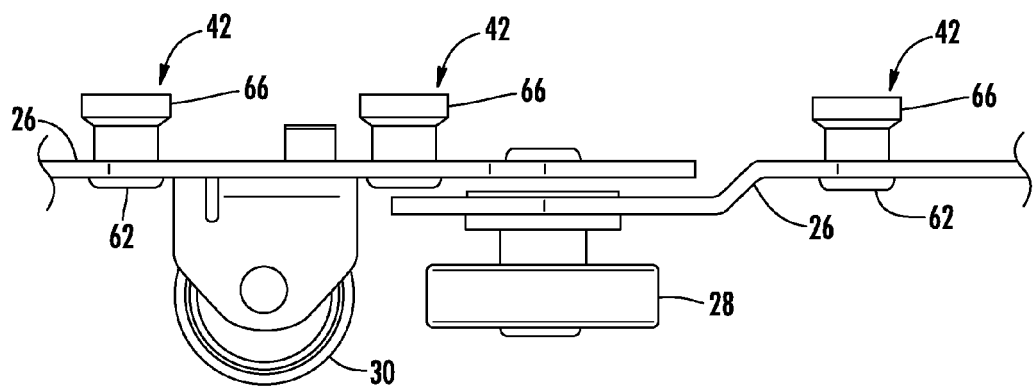
FIG. 6 is an enlarged top plan view of the area designated VI in FIG. 5b.
Figure 7:
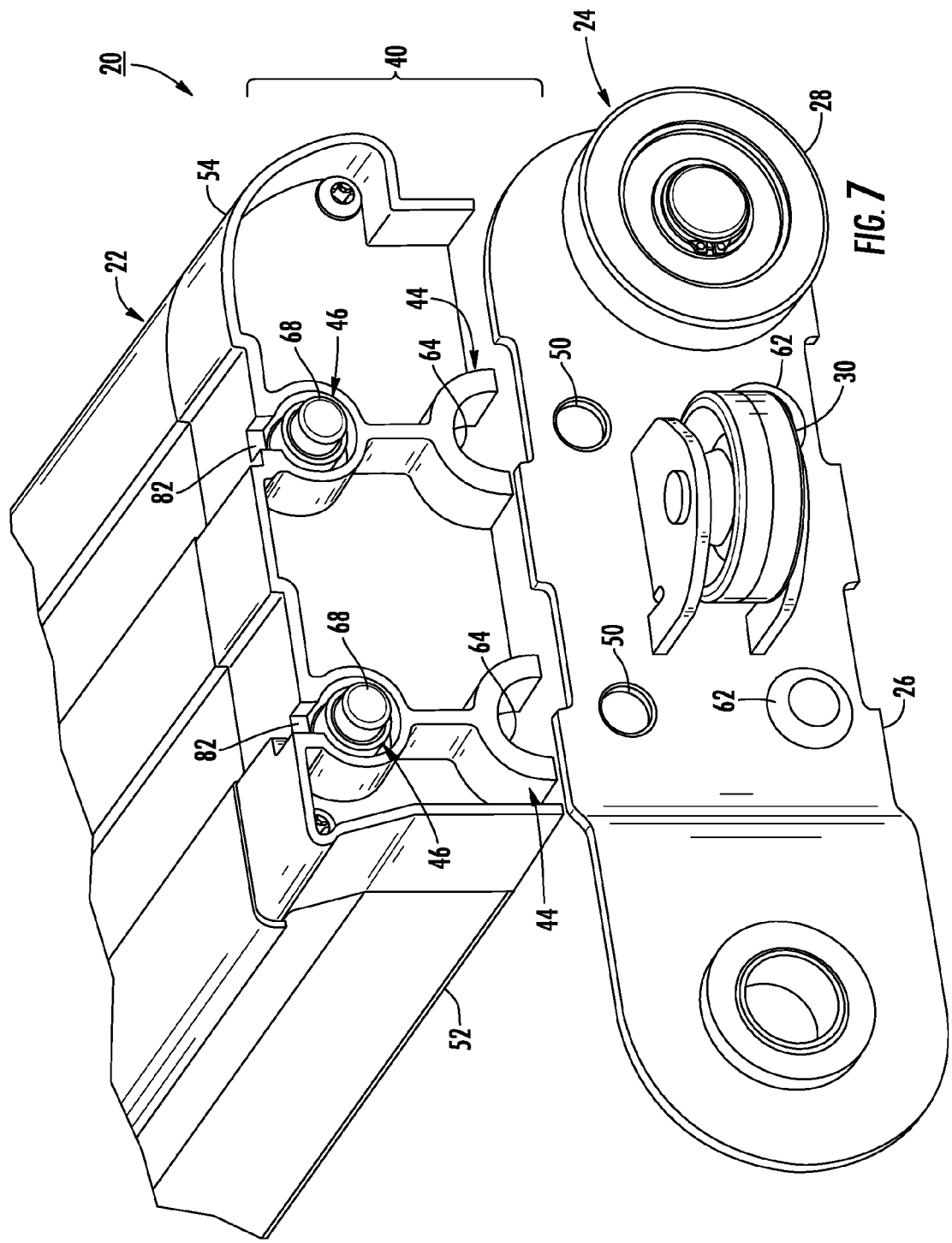
FIG. 7 is a perspective view of a slat attachment mechanism, according to an embodiment of the invention, with the slat separated from the wheel assemblies.
Figure 8:
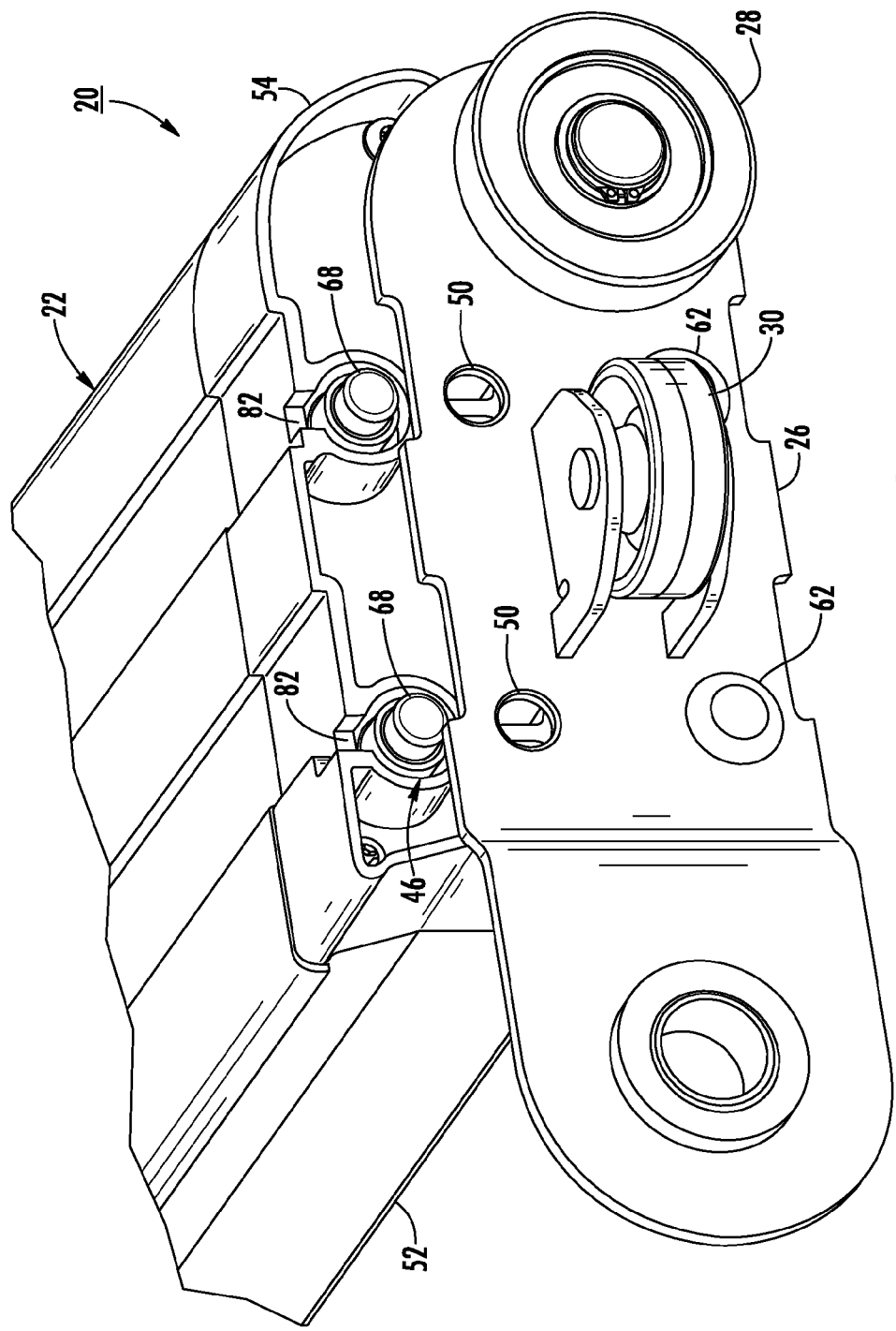
FIG. 8 is the same view as FIG. 7 with the slat almost attached to the wheel assembly.

Referring now to the drawings and the illustrative embodiments depicted therein, a positive displacement sorter 20 includes a plurality of parallel laterally extending slats 22 and a pair of wheel assemblies 24. Each wheel assembly interconnects common end portions of slats 22 thereby defining an endless web 32 that travels in a longitudinal direction, shown as the direction of travel in FIG. 1. It should be understood that the other wheel assembly (FIG. 5a) is a mirror image of the one shown in FIG. 5b and interconnects the opposite end portions of the slats. An upper surface of web 32 defines an article-conveying surface 34. A plurality of pusher shoes 36 each travel along one or more of slats 22 in order to laterally displace articles (not shown) on conveying surface 34. Sorter 20 includes a propulsion device for web 32, diverting gates and rails for pusher shoes 36, and the like, all of which are shown in commonly assigned U.S. Pat. Nos. 5,127,510; 6,814,216; 6,860,383; 6,866,136; 7,086,519; 7,117,988; 7,513,356; and 7,240,781; and U.S. Pat. Application Publication Nos. 2009/0139834 A1 and 2011/0042181 A1, the disclosures of which are hereby incorporated herein by reference.

Each wheel assembly 24 includes a plurality of interconnected vertical link plates 26, each associated with one slat 22, vertical wheels 28 that allow endless web 32 to travel in the longitudinal direction and a plurality of horizontal side thrust wheels 30 that resist lateral, or sideward, movement of endless web 32. Link plates 26 are interconnected by the axles for vertical wheels 28 generally in the manner disclosed in commonly assigned copending U.S. Patent Application Publication No. 2012/0048677 A1, by Mohan A. Ramankutty et al. entitled POSITIVE DISPLACEMENT SORTER WITH DISTRIBUTED DRIVE, the disclosure of which is hereby incorporated herein by reference. A cover, such as a capture angle 38, covers wheel assembly 24 and restrains vertical wheels 28 from rising significantly above their lower support surface 39. It should be understood that the techniques disclosed herein are equally useful with sorter wheel assemblies utilizing chains connected with the slats to propel the web.

Sorter 20 includes a plurality of attachment mechanisms 40, each attaching an end portion of one of slats 22 to one of wheel assemblies 24. Each of attachment mechanisms 40 includes a shoulder, generally shown at 42, a collar, generally shown at 44 and at least one locking member generally shown at 46. As will be explained in more detail below, collar 44 engages shoulder 42 thereby providing retention of an end of a slat 22 to said one of wheel assemblies 24 while locking member(s) 46 provides retention of collar 44 on shoulder 42. In the illustrated embodiment, locking member 46 includes a generally horizontally moveable elongated member 48 that engages an opening 50 in order to retain collar 44 on shoulder 42, particularly when the slat is either travelling upside down or experiencing centripetal forces when rounding an end of the sorter. Otherwise, shoulder 42 on collar 44 provides sufficient strength to carry the load on the slat from articles being sorted by sorter 20 on article-conveying surface 34, by a maintenance technician standing on article-conveying surface 34, or the like. In the illustrated embodiment, locking member(s) 46 are on slat 22 and openings 50 being defined in a corresponding link plate 26 of one of wheel assemblies 24. However, it may be possible to provide locking member 46 on link plate 26 engaging an opening 50 on the slat.

Shoulder 42 is on either wheel assembly 24, with collar 42 on slat 22, or vice versa. In the illustrated embodiment, shoulder 42 is mounted to a link plate 26 of a wheel assembly 24 and collar 44 is on slat 22. In this manner, collar 44 and opening(s) 50 provide a wheel assembly portion of attachment mechanism 40, while collar 44 and elongated member (s) 48 define a slat portion of attachment mechanism 40. In the illustrated embodiment, a vertical link plate 26 is provided at each of said slats and has set of through-holes 51 that are provided to mount collar 44. Through-holes 51 are symmetrical with opening(s) 50. This provides a common configuration of vertical plate 26 which can be used in both wheel assemblies merely by reversing the plates, as would be apparent to the skilled artisan.

Each slat 22 is made up of an elongated extrusion 52, such as an aluminum extrusion made by commonly available extrusion or pul-trusion techniques, and a generally polymeric slat extension 54 engaging the end portion of elongated extrusion 52, wherein elongated member(s) 48 and collar 44 are a part of slat extension 54.

Figure 9:
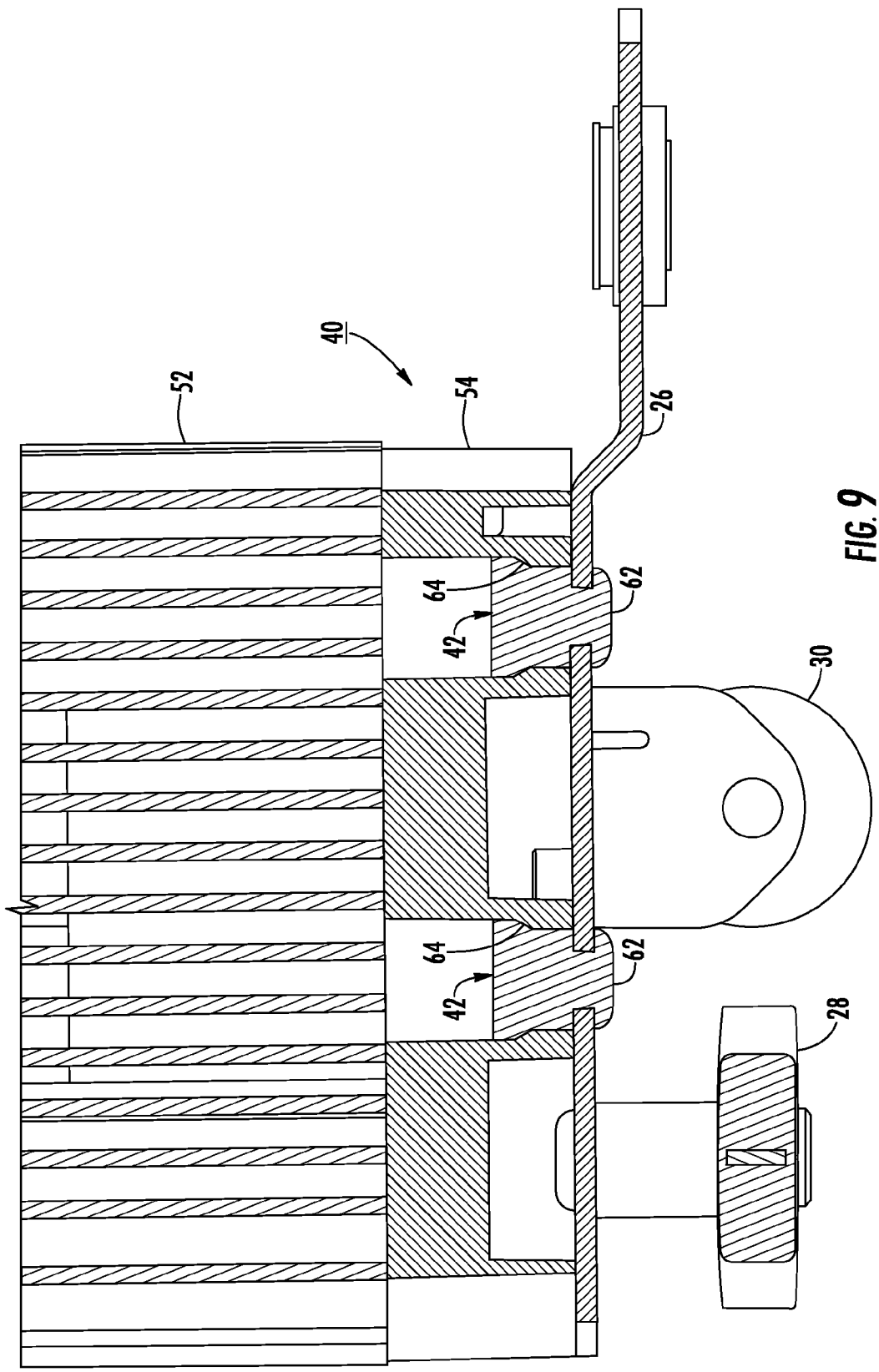
FIG. 9 is a sectional view taken along the lines IX-IX in FIG. 4 showing the shoulders supporting the sockets.

In the illustrated embodiment, shoulder 42 is made up two or more spaced apart horizontally extending studs 62 and collar 44 is made up of a corresponding number of sockets 64 that are configured to engage studs 62. Each stud 62 is circular in cross section and includes an enlarged head 66. Each stud 62 may be rigidly connected with its through-hole 51 by swaging, welding, or the like, as best seen in FIG. 9. Sockets 64 define a semi-circular recess that fits over enlarged head 66 in order to laterally retain the corresponding one of sockets 64 on that stud. In this manner, the engagement between shoulder 42 and collar 44 carries the weight of the slats and any load placed on article-conveying surface 34 and resists any lateral forces tending to separate the slat laterally from the wheel assembly. In this manner, the function of locking member 46 is to carry the weight of the slat when at a lower run of web 32 or at a transition between upper and lower runs of the web at the ends of sorter 20, as well as to ensure that collar 44 is kept in engagement with shoulder 42.

Figure 10:
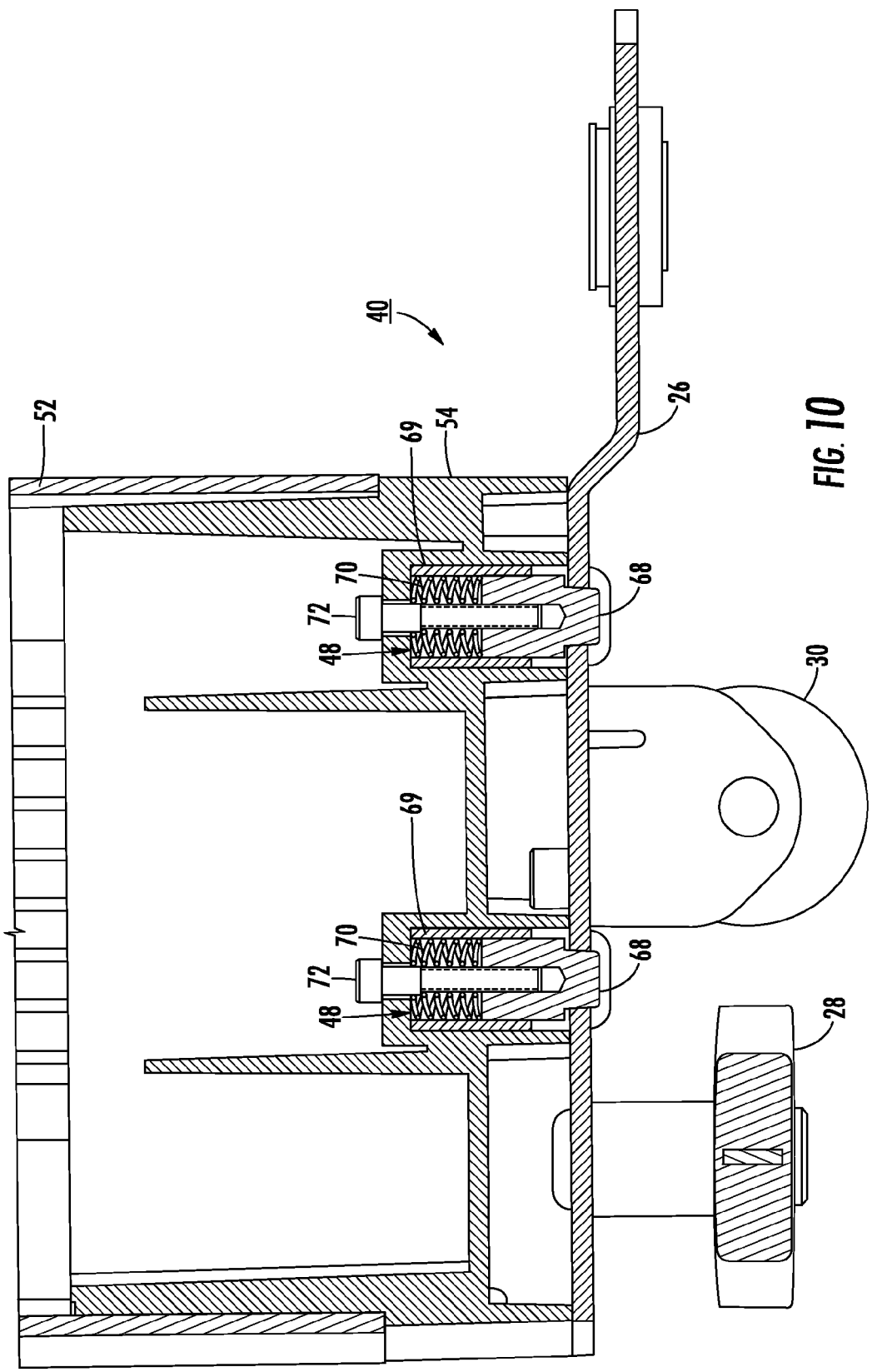
FIG. 10 is a sectional view taken along the lines X-X in FIG. 4 showing the locking pins in an extended position.

Elongated member(s) 48 is generally laterally moveable with respect to slats 22 in order to engage opening(s) 50. As best seen in FIG. 10, in the illustrated embodiment, each elongated member 48 is made up of a pin 68 and a biasing mechanism, such as a compression spring 70 that biases pin 68 into engagement with opening 50. A retention fastener 72 passes through an opening in a neck 76 of a cylinder 74, in which both pin 68 and biasing mechanism 70 reside, and engages pin 68 to retain the pin in cylinder 74 against the bias of biasing mechanism 70.

Pins 68 may be retracted by a variety of techniques in order to either separate a slat 22 from wheel assemblies 24 or return the slat to the mounted configuration. In the illustrated embodiment, slat extension 54 is made almost entirely from a structural plastic such as polypro long glass reinforced polymer that is formed by molding, although other materials may be used. Pins 68 move in bronze sleeves 69 to provide durability and lubrication. Pins 68 have tapered ends which taper such that the diameter at a distal end is less than the diameter of openings 50 and increase in diameter inwardly to a proximal diameter that forms an interference fit with openings 50. This provides ease of insertion of the pins while ensuring a movement-free attachment of the slats to the wheel assembly. Also, each pin 68 includes a dimple 69 at its end for engagement by a pin retraction tool 80.

Figure 11:
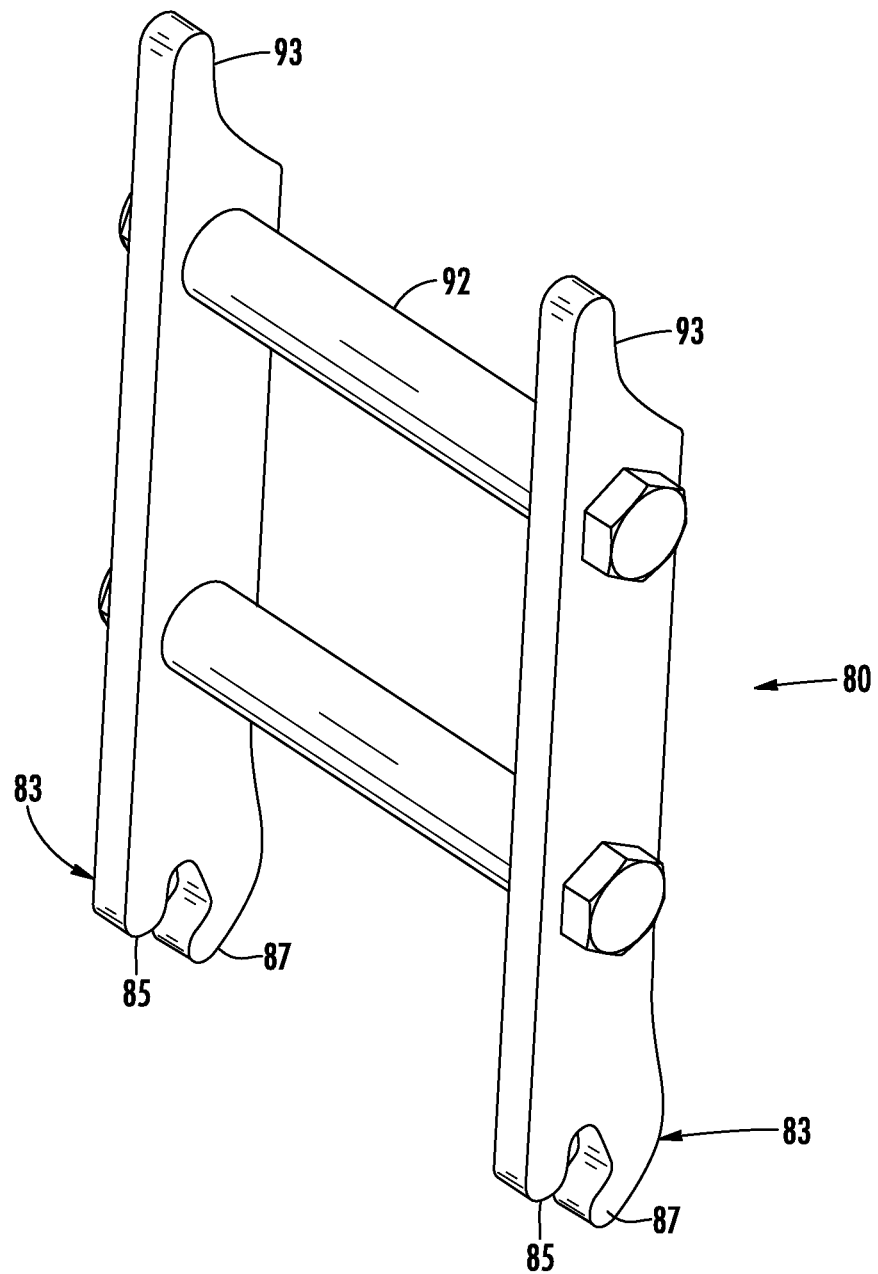
FIG. 11 is a perspective view of a pin retraction tool.

Pin retraction tool 80 actuates the pins 68 from outside of link plate 26 of wheel assembly 24 (FIG. 11). Also, retraction tool 80 is configured to retract two pins at a time, but could be configured to retract one pin at a time. Pin retraction tool 80 includes a handle 92 at one end and an engagement end 83 that is configured to engage the ends of two pins 68. Retraction tool 80 additionally includes a pivot 85. Pivot 85 pivots against link plate 26 in an indent or recess 82 in slat 22. Recess 82 allows pivot 85 to sufficiently engage the inner surface of link plate 26 in order to have sufficient leverage to compress pins 68. However, recess 82 does not need to open into the interior of slat extension 54 so does not provide a conduit for debris to enter the slat extension. Tool 80 additionally includes a finger 87 to retract a pin 68.

Figure 12:
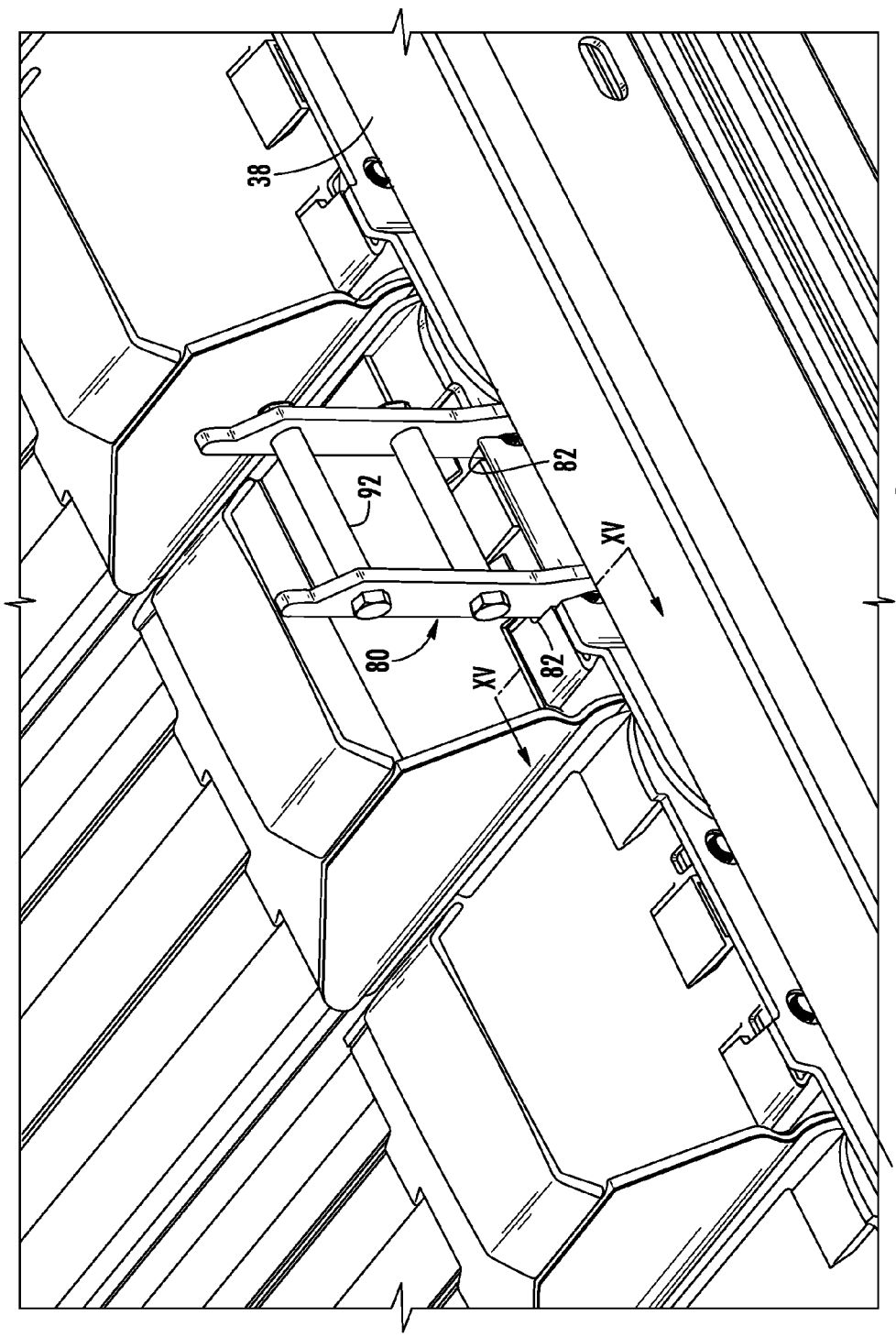
FIG. 12 shows a pin retraction tool juxtaposed with the slat attachment mechanism.
Figure 13:
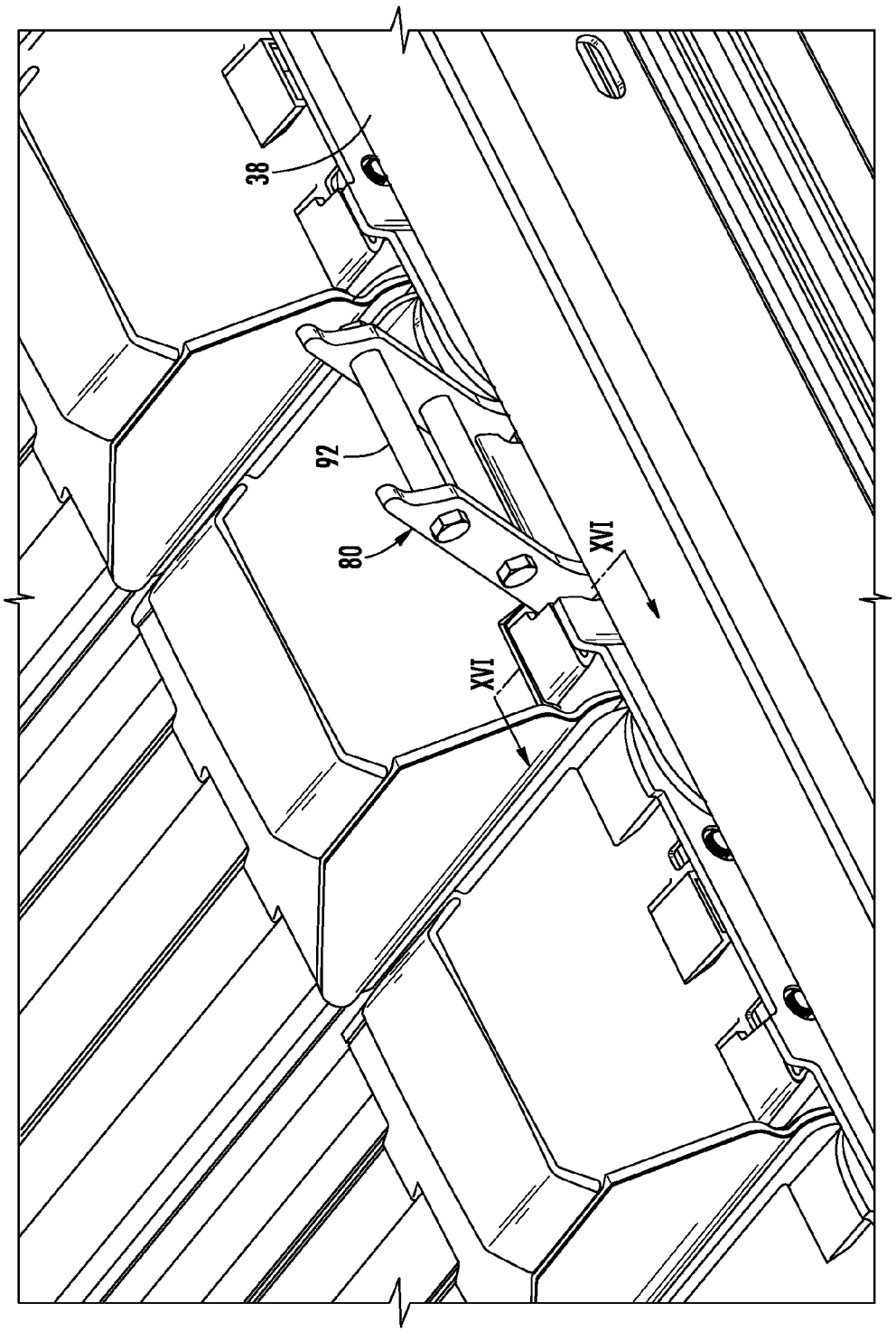
FIG. 13 shows the pin retraction tool being operated to retract the locking pins to remove the slat from the wheel assembly.
Figure 14:
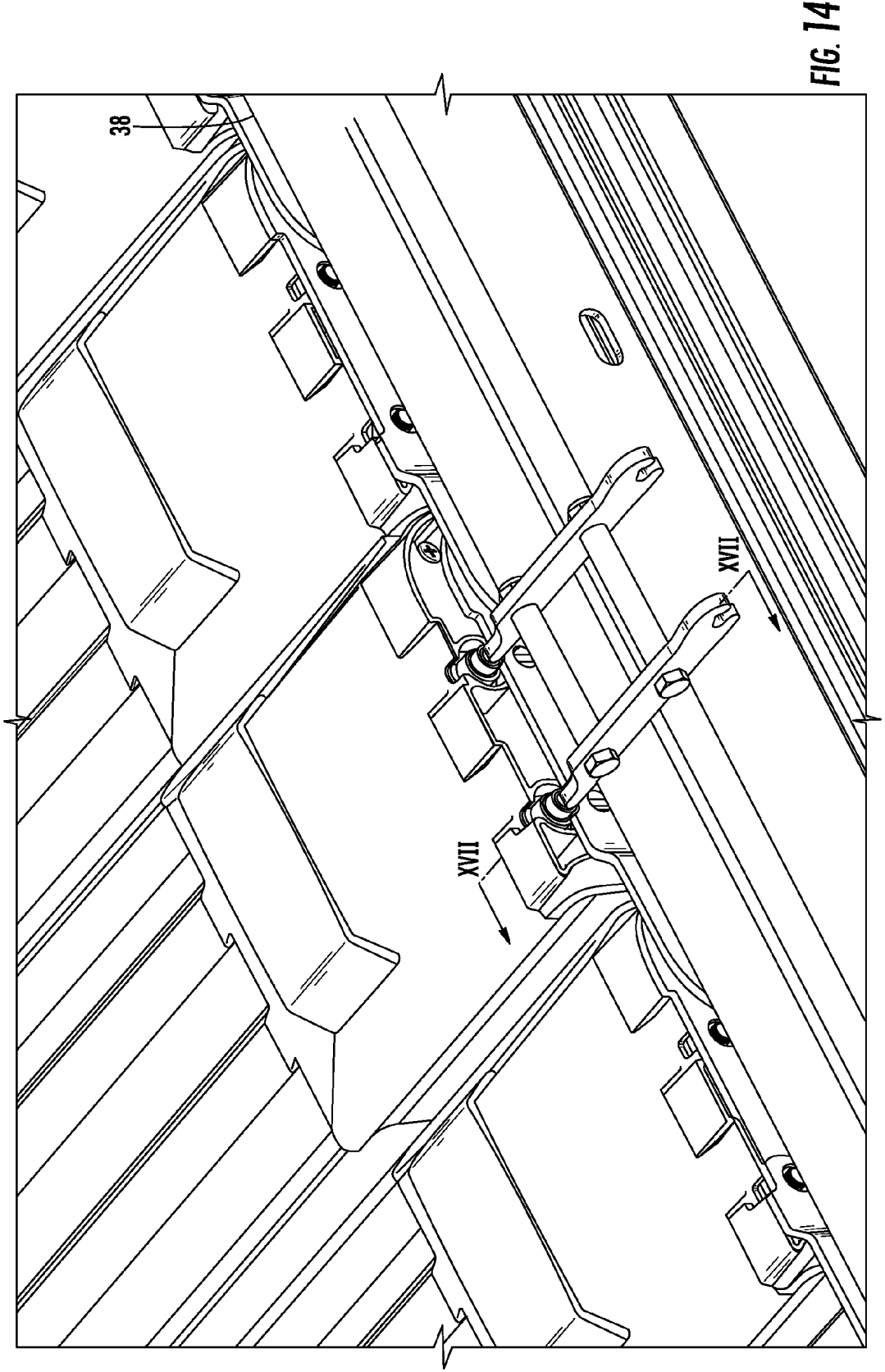
FIG. 14 is a perspective view showing the pin retraction tool being used to retract the pins in order to connect a slat to the wheel assembly.
Figure 15:
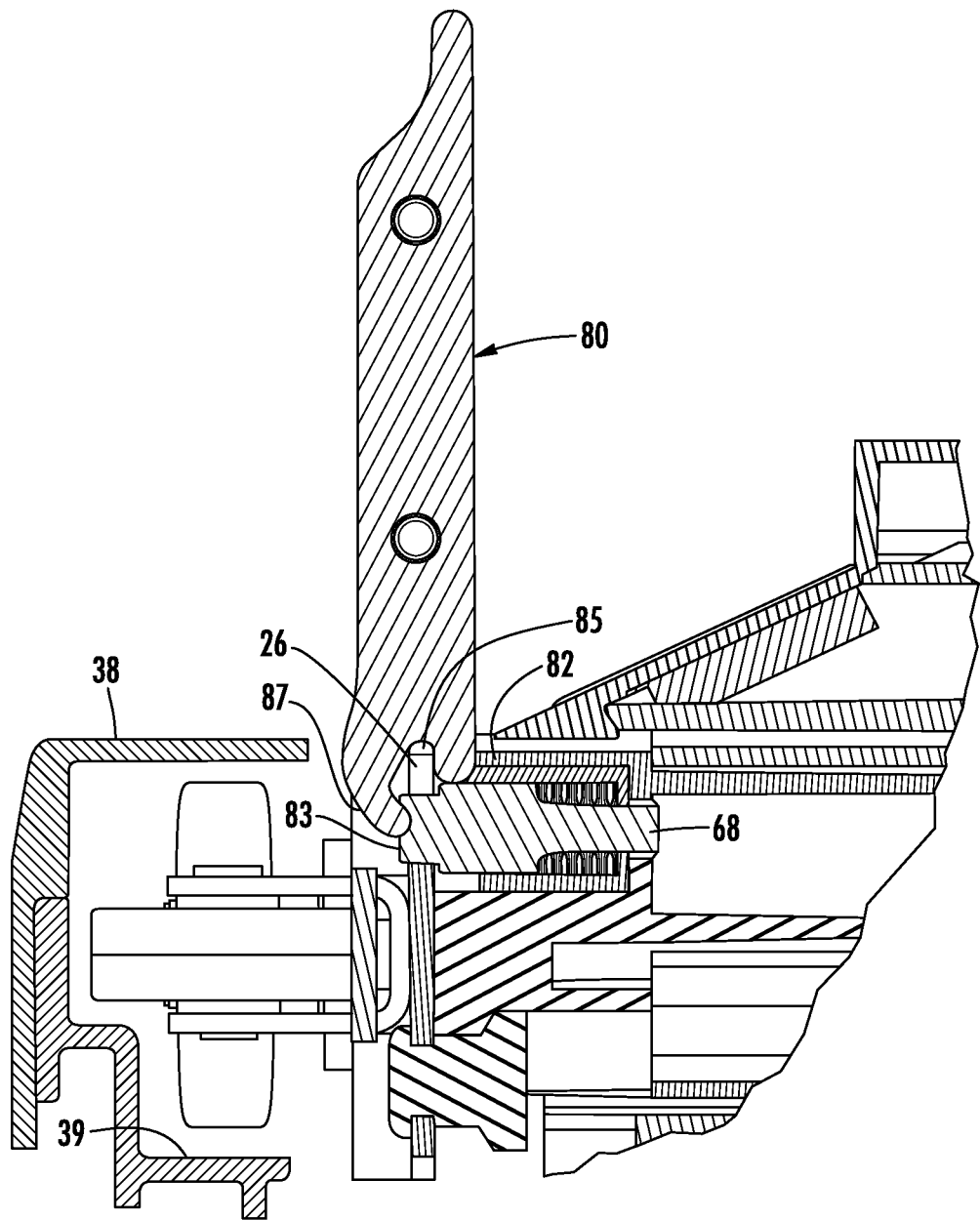
FIG. 15 is a sectional view taken along the lines XV-XV in FIG. 12.
Figure 16:
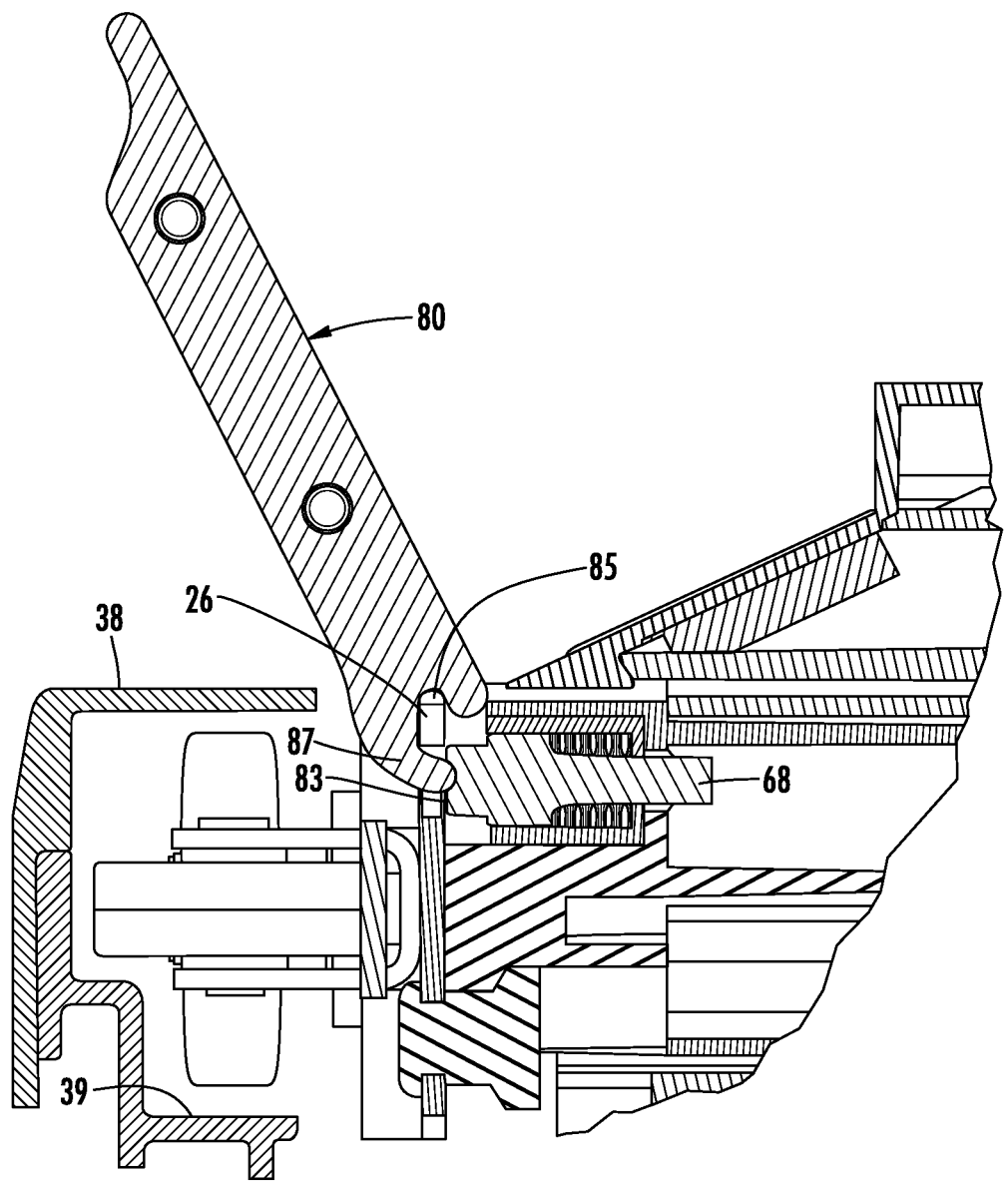
FIG. 16 is a sectional view taken along the lines XVI-XVI in FIG. 13.
Figure 17:
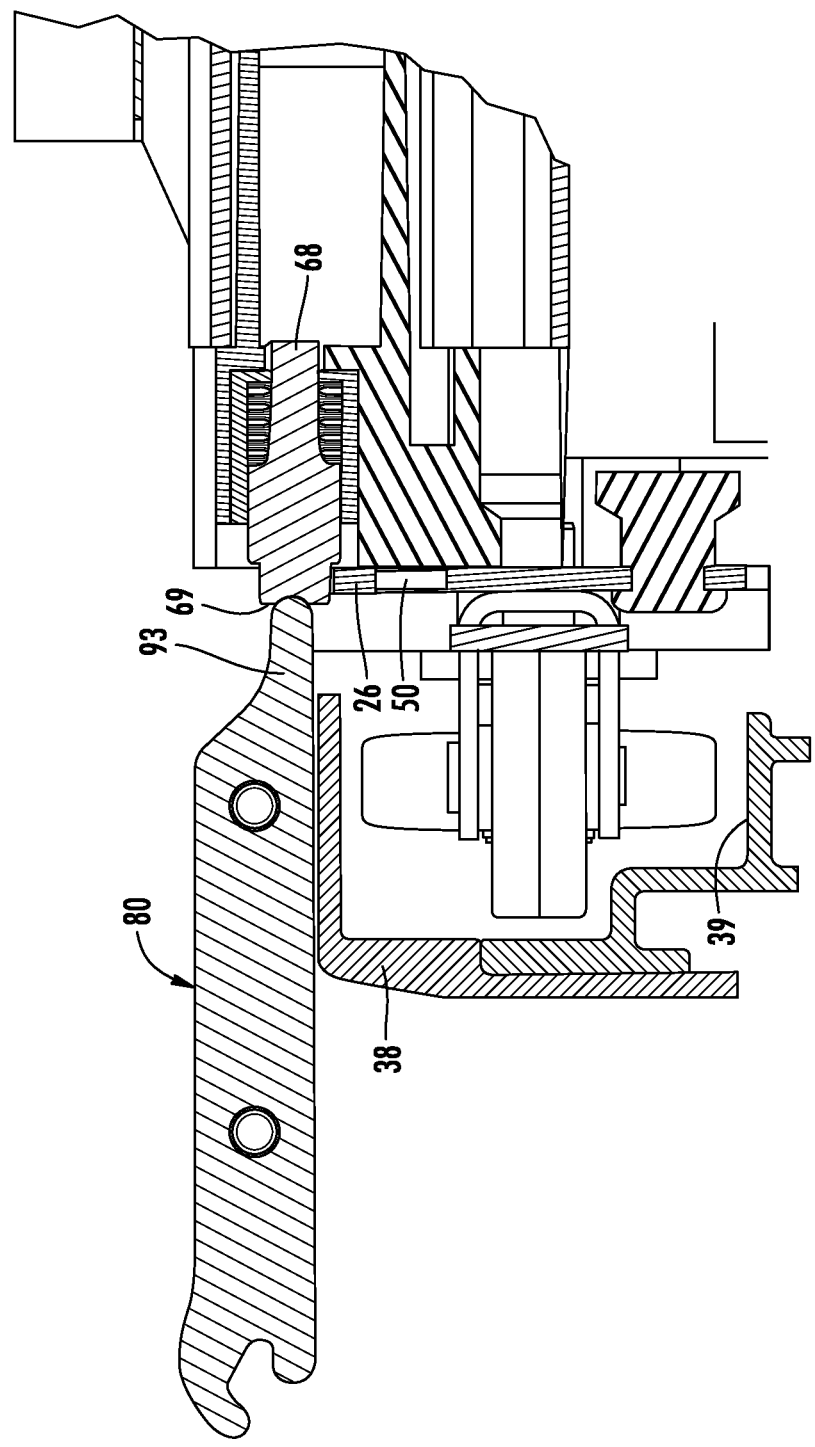
FIG. 17 is a sectional view taken along the lines XVII-XVII in FIG. 14.

In use, the operator rests pivot 85 against link plate 26 in recess 82, which aligns engaging end 83 with the corresponding pin 68 as shown in FIGS. 12 and 15. The operator then pivots handle 92 laterally outwardly, as seen in FIGS. 13 and 16 which retracts the pin, thereby allowing that end of the slat to be elevated sufficiently for the pin to move past opening 50 so that it stays retracted against the link plate. This process is repeated for the other end of the slat. The slat can then be removed by lifting upwardly. An end of handle 92 could have a tapered end 93 in order to compress a pin against link plate 126 to reinstall the slat, as seen in FIGS. 14 and 17. It should be apparent from the illustrations in FIGS. 12-17 that the slat can be removed by inserting pin retraction tool 80 between link plate 26 and cover or cap angle 38. Therefore, the slat can be removed without removing cover 38.

Another embodiment of a sorter 120 includes a plurality of attachment mechanisms 140, each attaching an end portion of one of slats 122 to one of wheel assemblies 124 (FIGS. 18-22). Each wheel assembly 124 includes interconnected link plates 126 mounting vertical support wheels 128 and horizontal side restraining wheels 130. Each of attachment mechanisms 140 includes a shoulder, generally shown at 142, a collar, generally shown at 144 and at least one locking member generally shown at 146. As will be explained in more detail below, collar 144 engages shoulder 142 thereby providing retention of an end of a slat 122 to said one of wheel assemblies 124 while locking member(s) 146 provides retention of collar 144 on shoulder 142. In the illustrated embodiment, locking member 146 includes a generally horizontally moveable elongated member 148 that engages an opening 150 in order to retain collar 144 on shoulder 142, particularly when the slat is either travelling upside down or experiencing centripetal forces when rounding an end of the sorter. Otherwise, collar 144 on shoulder 142 provides sufficient strength to carry the load on the slat from articles being sorted by sorter 120 on its article-conveying surface. In the illustrated embodiment, locking member(s) 146 are on slat 122 and openings 150 are defined in a corresponding link plate 126 of one of wheel assemblies 124. However, it may be possible to provide locking member 146 on link plate 126 engaging an opening 150 on the slat.

Shoulder 142 is on either wheel assembly 124, with collar 142 on slat 122, or vice versa. In the illustrated embodiment, shoulder 142 is mounted to a link plate 126 of a wheel assembly 124 and collar 144 is on slat 122. In this manner, collar 144 and opening(s) 150 provide a wheel assembly portion of attachment mechanism 140, while collar 144 and elongated member(s) 148 define a slat portion of attachment mechanism 140. In the illustrated embodiment, a vertical link plate 126 is provided at each of said slats and has set of through-holes 151 that are provided to mount collar 144. Through-holes 151 are symmetrical with opening(s) 150. This provides a common configuration of vertical plate 126 which can be used in both wheel assemblies merely by reversing the plates, as would be apparent to the skilled artisan.

Each slat 122 is made up of an elongated extrusion 152, such as an aluminum extrusion made by commonly available extrusion or pul-trusion techniques, and a generally polymeric slat extension 154 engaging the end portion of elongated extrusion 152, wherein elongated member(s) 148 and collar 144 are a part of slat extension 154. Slat extension 154 includes an insert 158 that mounts elongated member(s) 148 and defines collar 144 and a molded portion 160 that engages elongated extrusion 152, such as by forming an interference fit with the interior of elongated extrusion 152. In the illustrated embodiment, insert 158 may be made by a powdered metal forming process and insert-molded in the molded portion 160 or assembled to said molded portion 160, such as by using adhesive, plastic welding, or the like.

Figure 18:
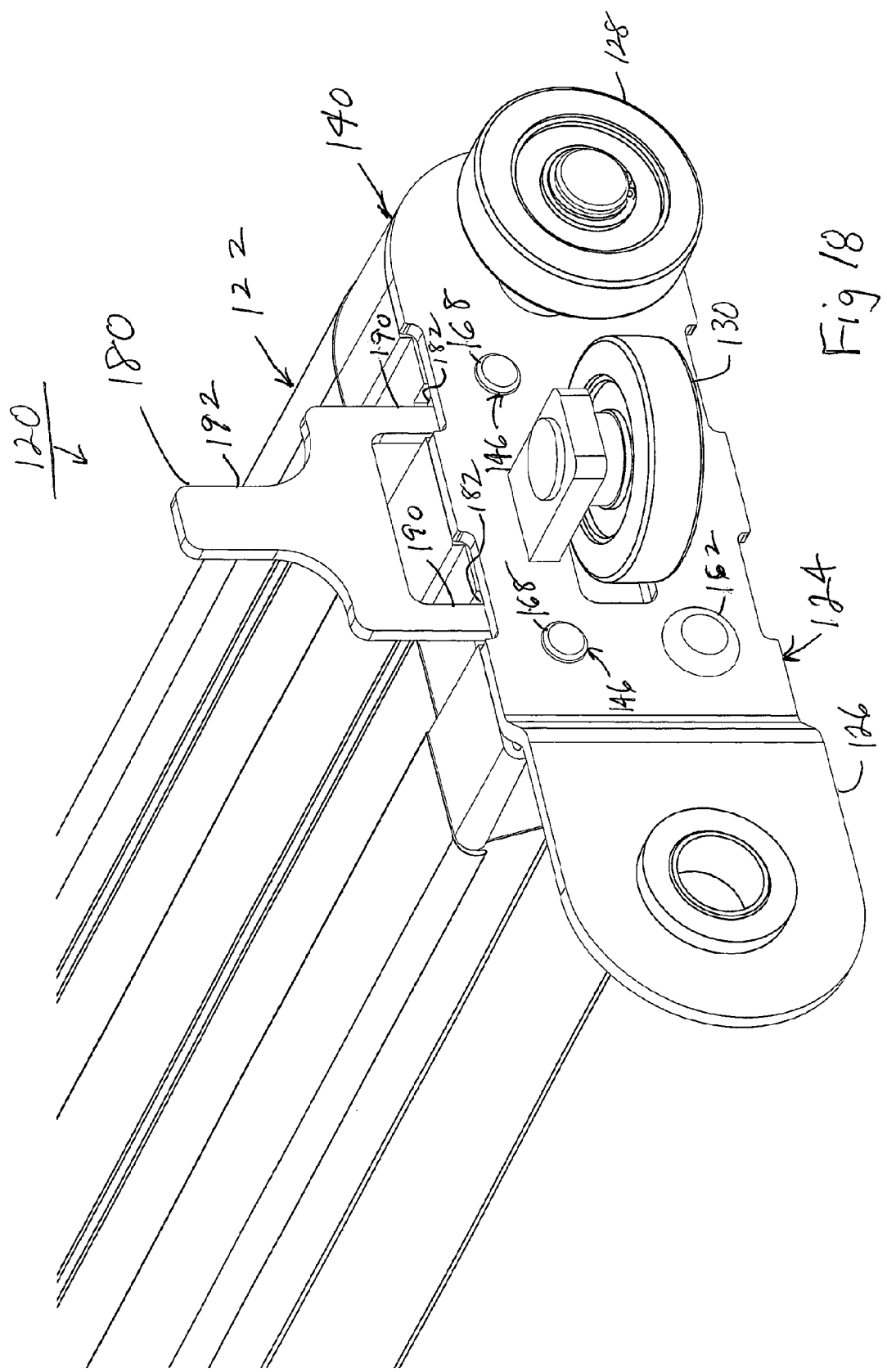
FIG. 18 is a perspective view of a slat attachment mechanism according to an alternative embodiment of the invention showing a pin retraction tool inserted into a slat attachment mechanism.
Figure 19:
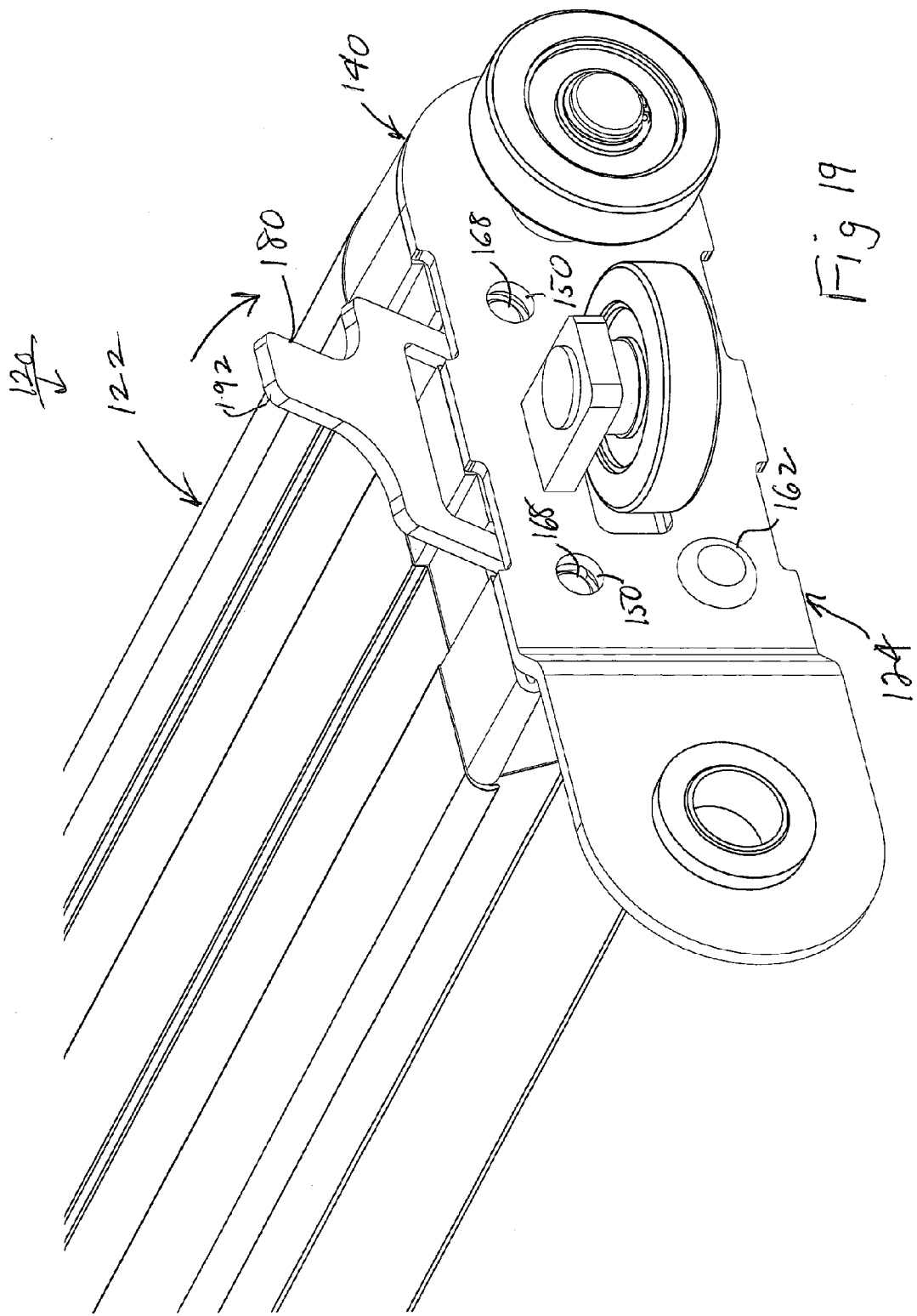
FIG. 19 is the same view as FIG. 18 showing the pin retraction tool being operated to retract the locking pins.
Figure 20:
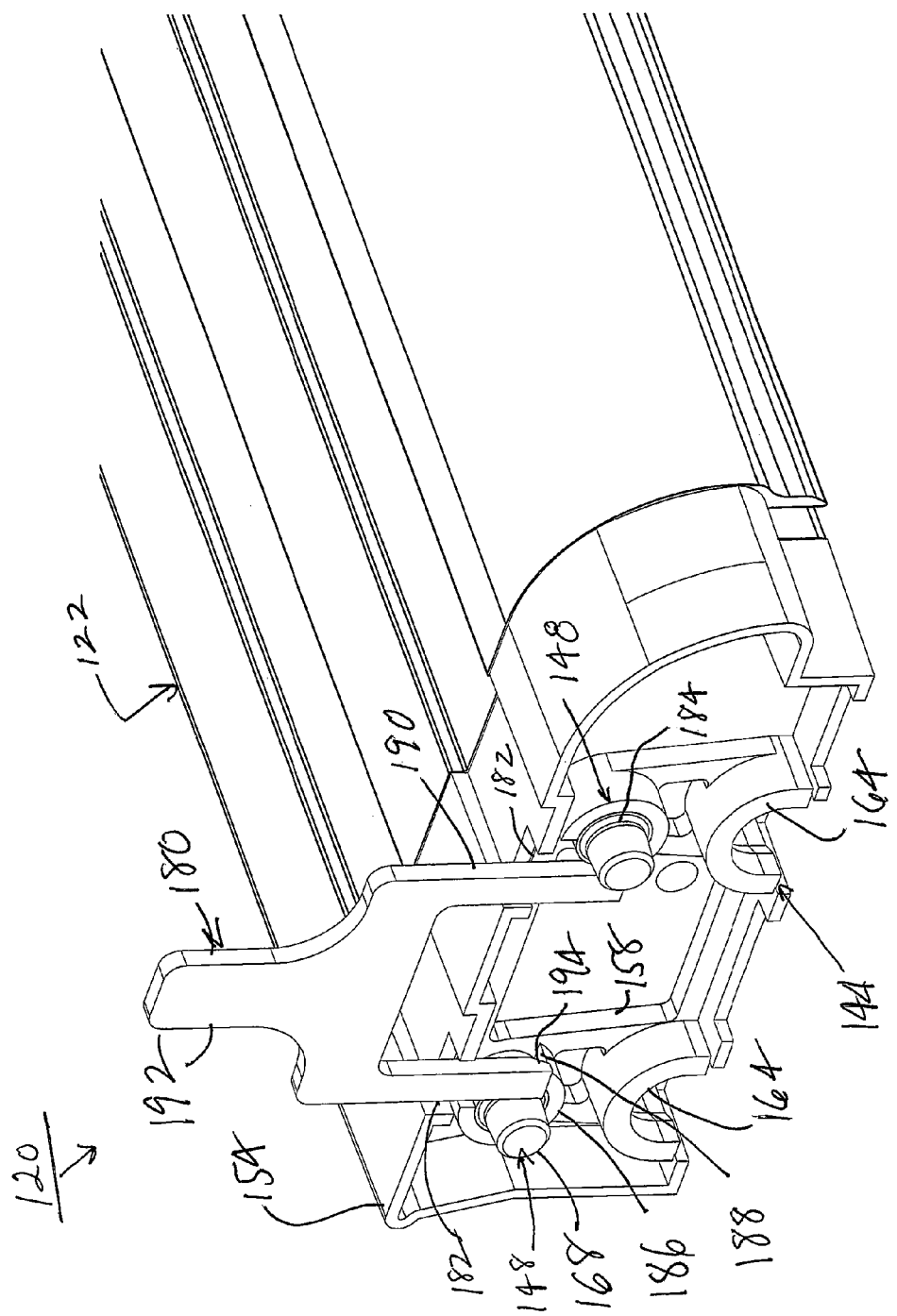
FIG. 20 is a perspective view of the slat attachment mechanism of FIG. 18 with the wheel assembly removed to illustrate the slat.
Figure 21:
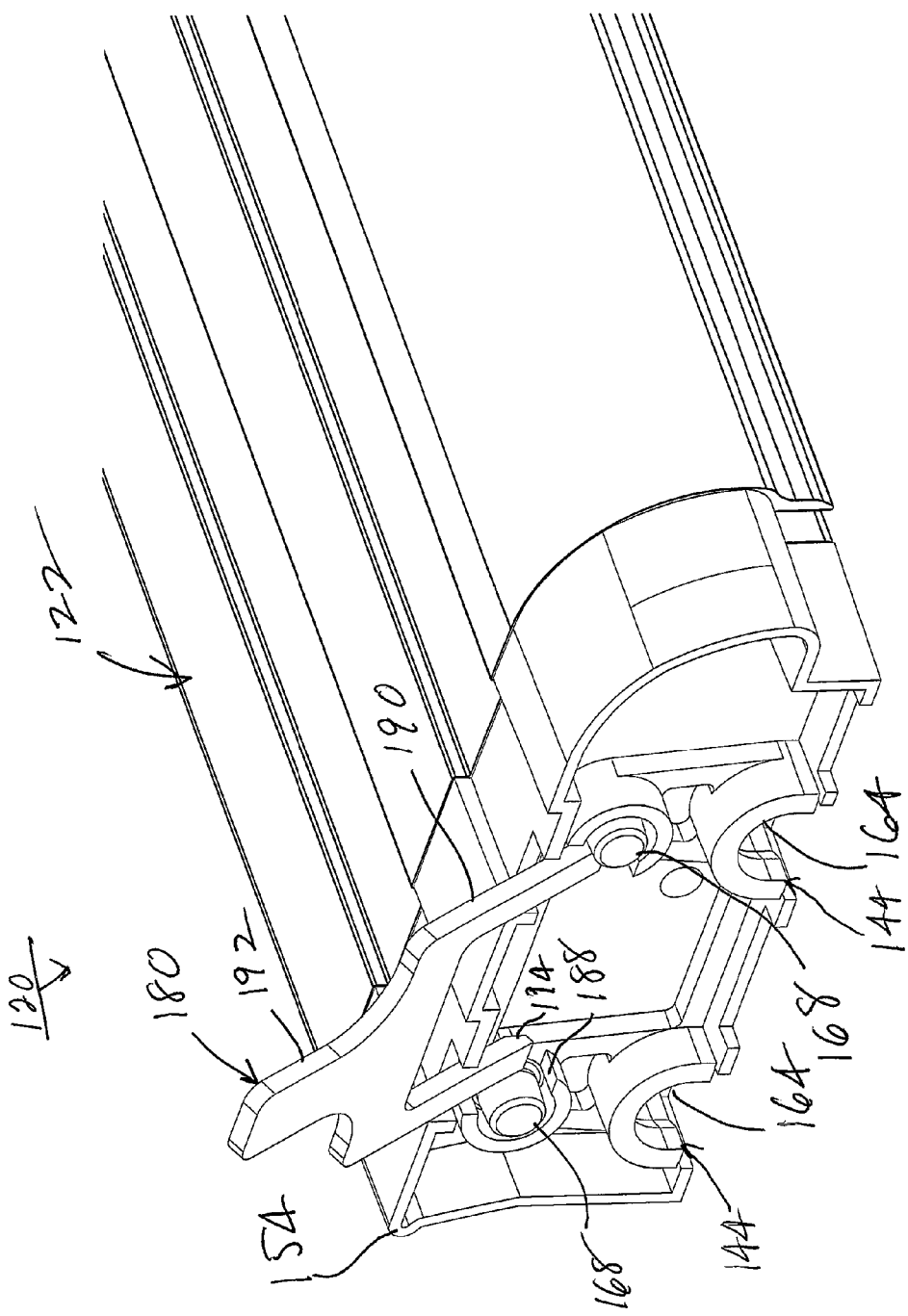
FIG. 21 is the same view as FIG. 20 showing the pin retraction tool being operated to retract the locking pins.

In the illustrated embodiment, shoulder 142 is made up two or more spaced apart horizontally extending studs 162 and collar 144 is made up of a corresponding number of sockets 164 that are configured to engage studs 162. Each stud 162 is circular in cross section and includes an enlarged head 166. Each stud 162 may be rigidly connected with its through-hole 151 by swaging, welding, or the like, as best seen in FIG. 18. Sockets 164 define a semi-circular recess that fits over enlarged head 166 in order to laterally retain the corresponding one of sockets 164 on that stud. In this manner, the engagement between shoulder 142 and collar 144 carries the weight of the slats and any load placed on article-conveying surface 134 and resists any lateral forces tending to separate the slat laterally from the wheel assembly. In this manner, the function of locking member 146 is to carry the weight of the slat when at a lower run of web 132 or at a transition between upper and lower runs of the web at the ends of sorter 120, as well as to ensure that collar 144 is kept in engagement with shoulder 142.

Elongated member(s) 148 is generally laterally moveable with respect to slats 122 in order to engage opening(s) 150. Each elongated member 148 is made up of a pin 168 and a biasing mechanism, such as a compression spring (not shown) that biases pin 168 into engagement with opening 150. A retention fastener (not shown) passes through an opening in a cylinder, in which both pin 168 and biasing mechanism 170 reside, and engages pin 168 to retain the pin in the cylinder against the bias of the biasing mechanism in a similar fashion that retention fastener 72 retains pin 68 in cylinder 74 against the bias of biasing mechanism 70.

Pins 168 may be retracted by a variety of techniques in order to either separate a slat 122 from wheel assemblies 124 or return the slat to the mounted configuration. In the illustrated embodiment, an access opening 182 is provided in the vicinity of each pin 168. Each pin 168 includes a change in diameter that defines a flat 184 that can be engaged by a tool 180 to retract that pin. In addition, slat extension 154 includes a partial flange 186 around the pin that defines a resting surface 188. With a blade extending through access opening 182, the tip of the blade can rest against resting surface 188 and the blade shaft can engage flat 184 in order to retract the pin.

While each pin 168 can be retracted by a flat-blade screwdriver or other hand tool, both pins 168 can be simultaneously retracted by retraction tool 180. Retraction tool 180 includes a pair of parallel arms, such as blades 190, joined by a common handle 192. The tip of each blade 190 may have a tapered end 194 in order to provide surface contact with flat 184. In operation, each blade 190 extends through one access opening 182, and tapered ends 194 rest on resting surface 188. The operator moves handle 192 toward the corresponding wheel assembly 124. This causes blades 190 to pivot about an edge of access opening 182 defined by a top edge of the corresponding link plate 126 to apply a force tending to retract the pin as can be seen by comparing FIGS. 18 and 19. The slat can then be lifted upwardly. The same general procedure can be used to attach the slat to a wheel assembly 124. The tapered end 194 of tool 180 can be positioned between the end of the pin and link plate 126. The tapered end serves as a ramp to compress the pins as the slat is pressed downward. Alternatively, retraction tool 180 can be used to retract the pins by applying a force against flats 180 without using a pivoting motion or by pivoting against link plate 126.

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments.

The embodiments of the invention in which an exclusive property or privilege is claimed are defined as follows:

1. A positive displacement sorter, comprising:
   a plurality of parallel laterally extending slats and a pair of wheel assemblies, each interconnecting common end portions of said slats thereby defining an endless web that travels in a longitudinal direction, an upper surface of said web defining an article-conveying surface;
   a plurality of pusher shoes, each of said shoes travelling along at least one of said slats in order to laterally displace articles on said conveying surface; and
   a plurality of attachment mechanisms, each attaching an end portion of one of said slats to one of said wheel assemblies, wherein each of said attachment mechanisms comprises a shoulder and a collar and at least one locking member, said collar engaging said shoulder thereby providing lateral retention of said slat to said one of said wheel assemblies to resist separation of the slat from said one of said wheel assemblies, said locking member providing vertical retention of said collar and said shoulder to resist separation of said collar and said shoulder, wherein said locking member comprises a generally horizontally moveable elongated member on one chosen from said slat and said one of said wheel assemblies engaging an opening on the other chosen from said slat and said one of said wheel assemblies.

2. The sorter as claimed in claim 1 wherein one chosen from said shoulder and said collar is defined on said one of said wheel assemblies and the other chosen from said shoulder and said collar is defined on said slat.

3. The sorter as claimed in claim 1 wherein each of said wheel assemblies comprises a generally vertical plate at each of said slats and wherein said opening is at said generally vertical plate.

4. The sorter as claimed in claim 3 wherein said shoulder is at said generally vertical plate and said generally vertical plate has a set of through-holes mounting said shoulder, wherein said through-holes are symmetrical with said openings wherein a common configuration of said vertical plate is used in both of said wheel assemblies.

5. The sorter as claimed in claim 1 wherein said shoulder comprises at least two spaced apart horizontally extending studs and said collar comprises at least two sockets engaging said studs.

6. The sorter as claimed in claim 1 wherein said generally horizontally moveable elongated member comprises a pin that is generally laterally moveable to engage said opening.

7. A positive displacement sorter, comprising:
   a plurality of parallel laterally extending slats and a pair of wheel assemblies, each interconnecting common end portions of said slats thereby defining an endless web that travels in a longitudinal direction, an upper surface of said web defining an article-conveying surface;
   a plurality of pusher shoes, each of said shoes travelling along at least one of said slats in order to laterally displace articles on said conveying surface; and
   a plurality of attachment mechanisms, each attaching an end portion of one of said slats to one of said wheel assemblies, wherein each of said attachment mechanisms comprises a shoulder and a collar and at least one locking member, said collar engaging said shoulder thereby providing retention of said slat to said one of said wheel assemblies, said locking member proving retention of said collar on said shoulder, wherein said locking member comprises a generally horizontally moveable elongated member, wherein said generally horizontally moveable elongated member is on said slat and said opening is on said one of said wheel assemblies.

8. A positive displacement sorter, comprising:
a plurality of parallel laterally extending slats and a pair of wheel assemblies, each interconnecting common end portions of said slats thereby defining an endless web that travels in a longitudinal direction, an upper surface of said web defining an article-conveying surface;
a plurality of pusher shoes, each of said shoes travelling along at least one of said slats in order to laterally displace articles on said conveying surface; and
a plurality of attachment mechanisms, each attaching an end portion of one of said slats to one of said wheel assemblies, wherein each of said attachment mechanisms comprises a shoulder and a collar and at least one locking member, said collar engaging said shoulder thereby providing retention of said slat to said one of said wheel assemblies, said locking member proving retention of said collar on said shoulder, wherein said locking member comprises a generally horizontally moveable elongated member on one chosen from said slat and said one of said wheel assemblies engaging an opening on the other chosen from said slat and said one of said wheel assemblies wherein said shoulder comprises at least tow spaced apart horizontally extending studs and said collar comprises at least two said sockets engaging said studs, including an enlarged head on each of said studs and a recess in each of said sockets in order to laterally retain one of the sockets and one of said studs.

9. The sorter as claimed in claim 8 wherein said studs are circular in cross section and said sockets comprise semicircular recesses.

10. A positive displacement sorter, comprising:
a plurality of parallel laterally extending slats and a pair of wheel assemblies, each interconnecting common end portions of said slats thereby defining an endless web that travels in a longitudinal direction, an upper surface of said web defining an article-conveying surface;
a plurality of pusher shoes, each of said shoes travelling along at least one of said slats in order to laterally displace articles on said conveying surface; and
a plurality of attachment mechanisms, each attaching an end portion of one of said slats to one of said wheel assemblies, wherein each of said attachment mechanisms comprises a shoulder and a collar and at least one locking member, said collar engaging said shoulder thereby providing retention of said slat to said one of said wheel assemblies, said locking member proving retention of said collar on said shoulder, wherein said locking member comprises a generally horizontally moveable elongated member on one chosen from said slat and said one of said wheel assemblies engaging an opening on the other chosen from said slat and said one of said wheel assemblies wherein said generally horizontally moveable elongated member comprises a pin that is generally laterally moveable to engage said opening including a biasing mechanism biasing said pin into engagement with said opening.

11. The sorter as claimed in claim 10 including a retention fastener that passes through an opening in a neck of a cylinder and engages said pin to retain said pin in said cylinder against said biasing mechanism.

12. A method of removeably attaching a slat from a positive displacement sorter having a plurality of parallel laterally extending slats and a pair of wheel assemblies, each interconnecting common end portions of said slats thereby defining an endless web that travels in a longitudinal direction, an upper surface of said web defining an article-conveying surface and a plurality of pusher shoes, each of said shoes travelling along at least one of said slats in order to laterally displace articles on said conveying surface, and an attachment mechanism attaching an end portion of one of said slats to one of said wheel assemblies, said method comprising:
each of said attachment mechanisms comprises a shoulder and a collar and at least one locking member, said collar engaging said shoulder thereby providing lateral retention of said slat to said one of said wheel assemblies, said locking member providing a vertical retention of said collar and said shoulder, wherein said locking member comprises a generally horizontally moveable elongated member on one chosen from said slat and said one of said wheel assemblies engaging an opening on the other chosen from said slat and said one of said wheel assemblies; and
horizontally retracting said elongated member from said opening to allow vertical separation of said collar and said shoulder and vertically separating said collar and said shoulder to remove the slat.

13. The method as claimed in claim 12 wherein one chosen from said shoulder and said collar are defined on said one of said wheel assemblies and the other chosen from said shoulder and said collar are defined on said slat.

14. The method as claimed in claim 12 wherein said generally horizontally moveable elongated member is on said slat and said opening is on said one of said wheel assemblies.

15. The method as claimed in claim 14 wherein said generally horizontally moveable elongated member comprises a pin in a cylinder and including laterally moving said pin in said cylinder to engage and disengage said opening.

16. The method as claimed in claim 15 including biasing said pin into engagement with said opening.

17. The method as claimed in claim 16 including retaining said pin in said cylinder against said biasing.

18. The method as claimed in claim 16 including retracting said pin from said opening to allow the associated slat to be connected to or disconnected from said one of said wheel assemblies.

19. The method as claimed in claim 12 wherein each of said wheel assemblies comprises a generally vertical plate at each of said slats and wherein said opening is at said generally vertical plate.

20. The method as claimed in claim 19 wherein said generally vertical plate has a set of through-holes mounting said shoulder, wherein said through-holes are symmetrical with said opening wherein a common configuration of said vertical plate is used in both of said wheel assemblies.

21. The method as claimed in claim 12 wherein said shoulder comprises at least two spaced apart horizontally extending studs and wherein said collar comprises at least two said sockets engaging said studs.

22. The method as claimed in claim 21 including an enlarged head on each of said studs in order to laterally retain one of the sockets on that stud.

23. The method as claimed in claim 22 wherein said studs are circular in cross section and said sockets comprise semi-circular recesses.

24. The method as claimed in claim 12 wherein said generally horizontally moveable elongated member comprises a pin in a cylinder and including laterally moving said pin in said cylinder to engage and disengage said opening.

\* \* \* \* \*

UNITED STATES PATENT AND TRADEMARK OFFICE
CERTIFICATE OF CORRECTION

PATENT NO.        : 8,820,520 B2                                                                Page 1 of 1
APPLICATION NO.   : 13/711127
DATED             : September 2, 2014
INVENTOR(S)       : Thomas H. Triesenberg, Jeffrey S. DeVries and Dennis J. Schuitema It is certified that error appears in the above-identified patent and that said Letters Patent is hereby corrected as shown below:

In the Claims

Column 9
Line 3, claim 7, "proving" should be --providing--.
Line 24, claim 8, "proving" should be --providing--.
Line 25, claim 8, "on" should be --and--.
Line 31, claim 8, "tow" should be --two--.
Line 55, claim 10, "proving" should be --providing--.

Signed and Sealed this
Twenty-second Day of September, 2015

Michelle K. Lee
*Director of the United States Patent and Trademark Office*